United States Patent
Honma

(10) Patent No.: US 7,130,069 B1
(45) Date of Patent: Oct. 31, 2006

(54) IMAGE-FORMING SYSTEM, CONTROL METHOD THEREFOR, IMAGE-FORMING APPARATUS, DATA PROCESSING METHOD, AND STORAGE MEDIUM

(75) Inventor: Masayuki Honma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 09/726,403

(22) Filed: Dec. 1, 2000

(30) Foreign Application Priority Data

Dec. 3, 1999 (JP) .............................. 1999/344327

(51) Int. Cl.
*G06F 3/12* (2006.01)
*G06K 1/00* (2006.01)

(52) U.S. Cl. .................................... 358/1.15; 358/1.13

(58) Field of Classification Search .............. 358/1.15, 358/1.14, 1.1, 1.9, 1.13, 1.16, 1.17, 401, 358/1.11, 1.12; 399/8, 79
See application file for complete search history.

(56) References Cited

U.S. PATENT DOCUMENTS

| | | | |
|---|---|---|---|
| 5,610,725 A * | 3/1997 | Kawada et al. ............. 358/403 |
| 5,812,747 A * | 9/1998 | Kayano et al. ............ 358/1.15 |
| 5,933,584 A * | 8/1999 | Maniwa ..................... 358/1.15 |
| 5,987,225 A | 11/1999 | Okano ........................ 395/112 |
| 6,160,638 A * | 12/2000 | Yasuda ....................... 358/438 |
| 6,226,095 B1 * | 5/2001 | Fukuta ....................... 358/1.13 |
| 6,516,157 B1 * | 2/2003 | Maruta et al. ................ 399/8 |
| 2003/0061322 A1 * | 3/2003 | Igarashi et al. ............. 709/223 |

FOREIGN PATENT DOCUMENTS

| | | |
|---|---|---|
| EP | 0 774 710 A1 | 5/1997 |
| EP | 0 797 344 A2 | 9/1997 |
| EP | 0 817 462 A2 | 1/1998 |
| EP | 0 845 714 A1 | 6/1998 |

* cited by examiner

*Primary Examiner*—Dov Popovici
(74) *Attorney, Agent, or Firm*—Fitzpatrick, Cella, Harper & Scinto

(57) ABSTRACT

In an image-forming apparatus such as a digital copying apparatus, even when a digital copying apparatus having print data desired by a user is used by someone else or is in trouble, the apparatus outputs the print data desired by the user without any delay at any time convenient to the user and in an output form the user desires, and thus increases availability thereof. The digital copying apparatus includes an network interface communicating with an external host apparatus, and a memory for storing image data and operation mode data received through the network interface, and prints out the image data on a printer section. The digital copying apparatus receives image data and operation mode data from the other digital copying apparatus and prints out the image data on the printer section thereof.

25 Claims, 14 Drawing Sheets

IMAGE-FORMING SYSTEM, CONTROL METHOD THEREFOR, IMAGE-FORMING APPARATUS, DATA PROCESSING METHOD, AND STORAGE MEDIUM

BACKGROUND OF THE INVENTION

1. Field of the Invention

The present invention relates to an image-forming system including an image-forming apparatus that communicates with other apparatuses for data exchange.

2. Description of the Related Art

There are conventionally known image-forming apparatuses such as a digital copying apparatus having an electronic sorting function. Such a digital copying apparatus reads the image of all original documents to be copied, stores the image data in a memory such as a hard disk, and then retrieves the image data of any desired original document from the memory to print the image out. Without the need for a sorting device having a plurality of bins, the copying apparatus discharges copied sheets in a sorted state.

In a known electronic sorting function for PDL (Page Description Language) images, the digital copying apparatus receives application PDL data from a host computer through a network, develops the PDL data into a bit-map image, stores the bit-map image in a memory such as a hard disk, repeatedly reads an image from the memory to print the image, and sorts the copied sheets.

In one proposed system, the hard disk of a digital copying apparatus may be divided into users' personal areas, and the bit-map image developed from PDL data is once stored in a user's own area (personal box). To print an image from the personal box, a user enters a password to access his or her area from a control panel of the copying apparatus. Such a system is useful when the user wants to print data which requires secrecy.

A user operates a control panel on a digital copying apparatus to print out an image after transmitting image data to a personal box in the digital copying apparatus from a host computer in such a system. If someone else then uses the copying apparatus for copying, the user is forced to wait for the end of the copying operation. If the copying apparatus fails to properly work for lack of toner or paper sheets or any other troubles, printing cannot be performed until the copying apparatus is restored for normal operation. It is preferred that desired print data be output at any time convenient to the user and with an output form the user desires, regardless of the status of the copying apparatus.

SUMMARY OF THE INVENTION

It is an object of the present invention to provide an image-forming system free from the above problem, a control method for the image-forming system, an image-forming apparatus, a data processing method, and a storage medium.

It is another object of the present invention to provide an image-forming system that outputs data desired by a user without any delay at any time convenient to the user and in an output form the user desires, and increases availability thereof, even when the apparatus storing print data of the user is used by someone else or has a problem, and to provide a control method for the image-forming system, an image-forming apparatus, a data processing method, and a storage medium.

In one aspect, an image-forming system of the present invention includes a plurality of image-forming apparatuses with printer sections, each image-forming apparatus including a network communication unit and a storage unit for storing image data and operation mode data received through the network communication unit, a data acquisition unit through which a first image-forming apparatus acquires, through the network communication unit, the image data and the operation mode data stored in another image-forming apparatus, and an operation mode update unit for automatically updating the operation mode of the first image-forming apparatus to an operation mode in accordance with the acquired operation mode data.

In another aspect, an image-forming system of the present invention includes a plurality of image-forming apparatuses with printer sections, each image-forming apparatus including a network communication unit and a storage unit for storing image data and operation mode data received through the network communication unit, a data acquisition unit through which a first image-forming apparatus acquires, through the network communication unit, the image data and the operation mode data stored in another image-forming apparatus, and an operation mode update unit for updating the operation mode of the first image-forming apparatus to an operation mode in accordance with the acquired operation mode data in response to a command from a control panel.

In yet another aspect, an image-forming apparatus of the present invention communicates data, via a data communication medium, with a remote image-forming apparatus storing a series of image data to be printed. The image-forming apparatus includes a transmitter unit for transmitting, to the remote image-forming apparatus via the data communication medium, first instruction data requesting that the remote image-forming apparatus transmit image data stored therein, and an acquisition unit for acquiring, via the data communication medium, data which is output by the remote image-forming apparatus in response to the first instruction data, and which includes operation mode data preset against the stored series of image data to be printed in the remote image-forming apparatus.

In yet another aspect, a control method of the present invention controls an image-forming system including a plurality of image-forming apparatuses with printer sections, each image-forming apparatus including a network communication unit and a storage unit for storing image data and operation mode data received through the network communication unit. The control method includes an acquisition step of acquiring, for a first image-forming apparatus, the image data and the operation mode data stored in another image-forming apparatus through the network communication unit, and an updating step of automatically updating the operation mode of the first image-forming apparatus to an operation mode in accordance with the acquired operation mode data.

In yet another aspect, a computer-readable storage medium of the present invention stores a software program to be executed by an image-forming system that includes a plurality of image-forming apparatuses with printer sections, each image-forming apparatus including a network communication unit and a storage unit for storing image data and operation mode data received through the network communication unit. The software program includes program codes for an acquisition step of acquiring, for a first image-forming apparatus, the image data and the operation mode data stored in another image-forming apparatus through the network communication unit, and an updating step of automatically updating the operation mode of the first image-forming apparatus to an operation mode in accordance with the acquired operation mode data.

In yet another aspect, a data processing method of the present invention includes a transmitting step of transmitting, to a remote image-forming apparatus storing a series of image data to be printed, via a data communication medium, first instruction data requesting that the remote image-forming apparatus transmit image data stored therein, and an acquisition step of acquiring, via the data communication medium, data which is output by the remote image-forming apparatus in response to the first instruction data, and which includes operation mode data preset against the stored series of image data to be printed in the remote image-forming apparatus.

In yet another aspect, a computer-readable storage medium of the present invention stores a software program, which includes program codes for a transmitting step of transmitting, to a remote image-forming apparatus storing a series of image data to be printed, via a data communication medium, first instruction data requesting that the remote image-forming apparatus transmit image data stored therein, and an acquisition step of acquiring, via the data communication medium, data which is output by the remote image-forming apparatus in response to the first instruction data, and which includes operation mode data preset against the stored series of image data to be printed in the remote image-forming apparatus.

Further objects, features, and advantages of the present invention will be apparent from the following description of the preferred embodiments with reference to the attached drawings.

DESCRIPTION OF THE PREFERRED EMBODIMENTS

The embodiments of the present invention are now discussed, with reference to the drawings.

First Embodiment

Figure 1:
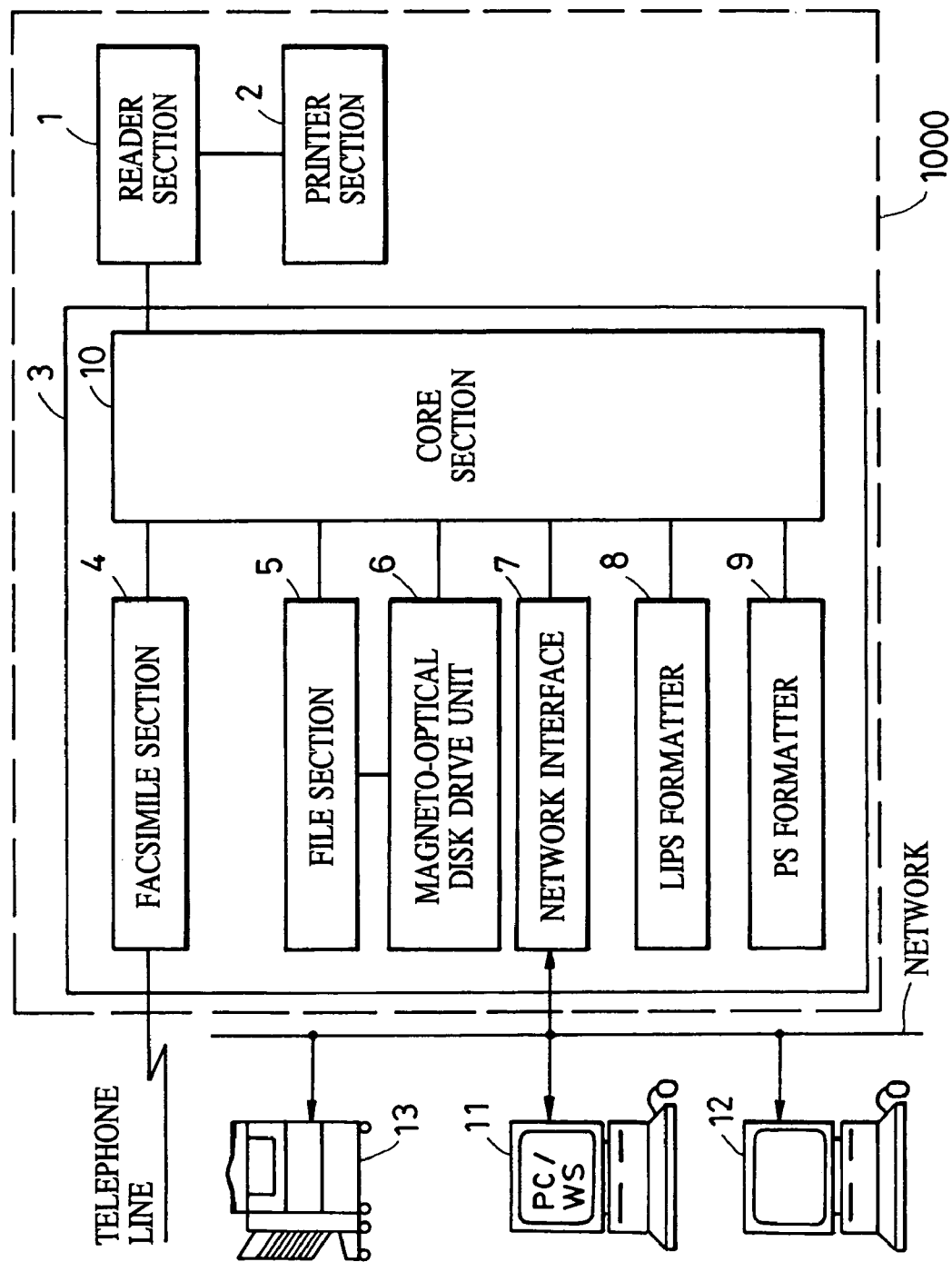
FIG. 1 is a block diagram showing the construction of an image-forming apparatus of one embodiment of the present invention.

FIG. 1 is a block diagram showing the construction of an image-forming apparatus 1000 of a first embodiment of the present invention. The image-forming apparatus 1000 is a digital copying apparatus having a network communication function and an electronic sorting function.

A reader section 1 reads the image from an original document, and outputs the data of the image to a printer section 2 and an image input/output controller 3. The printer section 2 prints out the image corresponding to the image data from the reader section 1 and the image input/output controller 3. The image input/output controller 3, connected to the reader section 1, is composed of a facsimile section 4, a file section 5, a network interface 7, a LIPS (LBP (laser beam printer) image processing system) formatter 8, which is one type of PDL, a PS (PostScript) formatter 9, which is another type of PDL, and a core section 10.

The facsimile section 4 decompresses compressed image data received through a telephone line, transfers the decompressed image data to the core section 10, or compresses image data coming from the core section 10, and transmits the compressed image data over the telephone line.

The file section 5 is connected to a magnetooptical disk drive unit 6. The file section 5 compresses image data transferred from the core section 10, and stores, in a magnetooptical disk loaded in the magnetooptical disk drive unit 6, the compressed image data along with a keyword by which the image data is searched. The file section 5 searches for the compressed image data stored in the magnetooptical disk in response to the keyword transferred via the core section 10, reads and decompresses the searched compressed image data, and transfers the decompressed image data to the core section 10.

The network interface 7 serves as an interface between a personal computer or a workstation (hereinafter referred to as PC/WC) 11 and the core section 10. The network interface 7 also serves as an interface between an external apparatus, such as a digital copying apparatus 13, connected to a network, and the core section 10. (The digital copying apparatus 13 has the same construction and the same functions as those of the image-forming apparatus 1000). Through the network interface 7, the image-forming apparatus 1000 receives a PDL image from a host apparatus, in the first embodiment, and reads an original document image from the hard disk in another digital copying apparatus. The image-forming apparatus 1000 connects to another image-forming apparatus as a digital copying apparatus 13 in the first embodiment. Alternatively, the image-forming apparatus 1000 may connect to a plurality of image-forming apparatuses via a network. The image-forming apparatus 1000 thus exchanges data with each of the plurality of the image-forming apparatuses.

A network server 12 is a core of network control. Formatters 8 and 9 develops PDL data transferred from the PC/WS 11 into image data that is recordable by the printer section 2. As will be discussed more in detail later, the core section 10 controls signal flow between the reader section 1, the facsimile section 4, the file section 5, the network interface 7, and the formatters 8 and 9.

Figure 2:
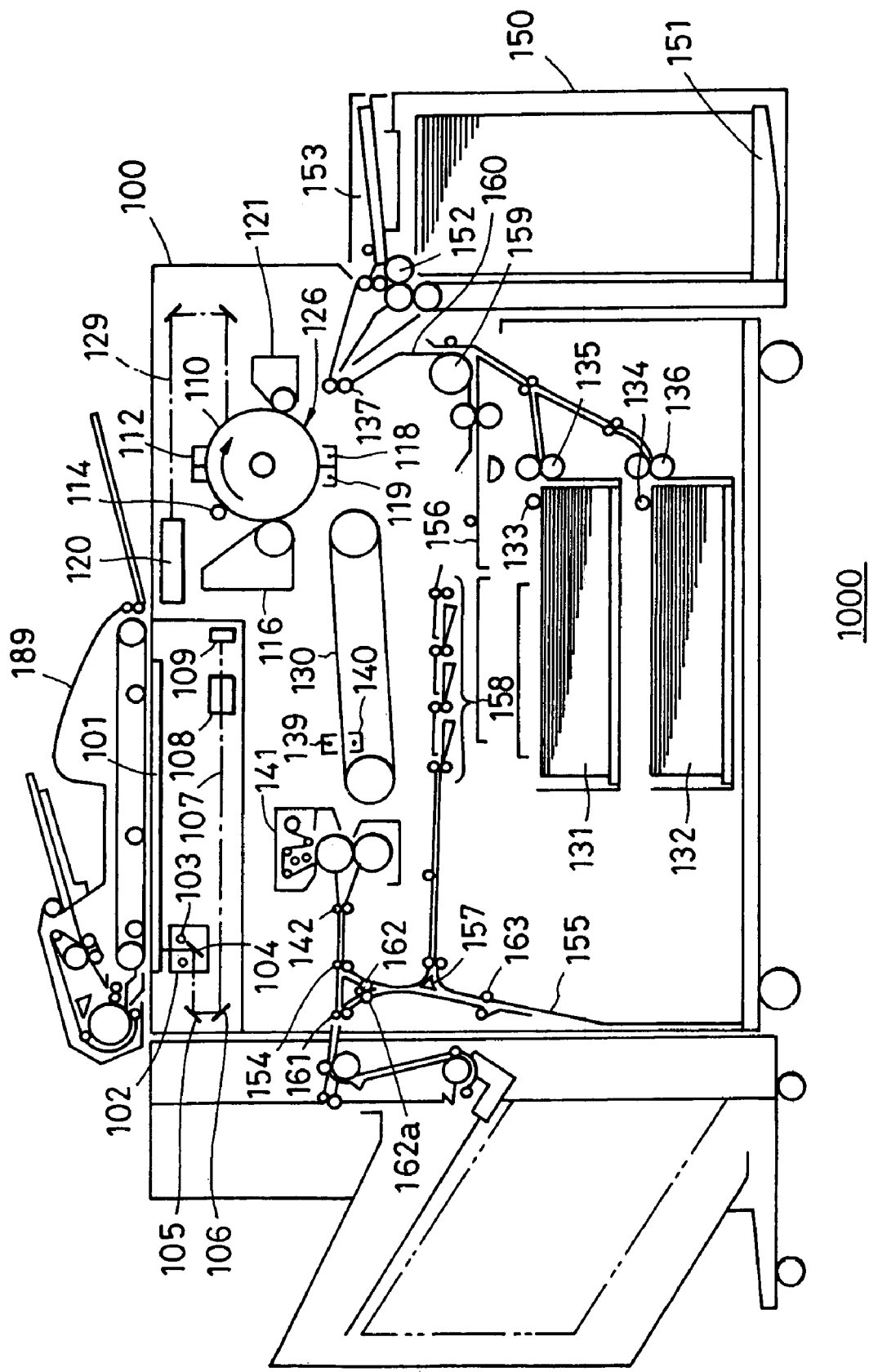
FIG. 2 is a sectional view showing the internal construction of the image-forming apparatus of the above embodiment.

FIG. 2 is a sectional view showing the internal construction of the image-forming apparatus 1000. The image-forming apparatus 1000 includes an apparatus body 100 of the copying apparatus, and a recycling document feeder (RDF) 189. Referring to FIG. 1, the reader section 1, corresponds to components designated 101 through 109 arranged in the upper portion of the apparatus body 100 as shown in FIG. 2, and the printer section 2 corresponds to components designated 110 through 163 internally arranged in the apparatus body 100 as shown in FIG. 2.

Referring to FIG. 2, there are shown a glass platen 101 serving a document support surface, a scanner 102, a document illumination lamp 103, a scanning mirror 104, etc.

The scanner 102 is reciprocally moved in a predetermined direction by a motor (unshown), and a light beam 107 reflected from an original document is reflected off scanning mirrors 104–106, transmitted through a lens 108, and then focused on a CCD 109 as an image sensor.

An exposure control unit 120 includes a laser, a polygon scanner, etc., and illuminates a photoconductive drum 110 with a laser light beam 129 which has been modulated with an image signal on which a predetermined process is performed, as will be discussed later. The image signal is an electrical signal, which the CCD image sensor 109 converted from the light beam reflected from the original document.

Arranged around the photoconductive drum 110 are a primary charging unit 112, a development unit 121, a transfer charging unit 118, a cleaning unit 116, and a pre-exposure lamp 114. In an image-forming section 126, the photoconductive drum 110 is rotated by a motor (not shown) in a direction represented by an arrow and is charged to a desired potential by the primary charging unit 112, and is then irradiated with the laser light beam 129 from the exposure control unit 120. An electrostatic latent image is thus formed on the photoconductive drum 110. The electrostatic latent image formed on the photoconductive drum 110 is then developed by the development unit 121, thus becoming a visible toner image.

A copy sheet, picked up from an upper cassette 131 or a lower cassette 132 by pickup rollers 133 and 134, is sent to an upper portion of the apparatus by feed rollers 135 and 136, and fed to the transfer belt by a timing roller 137. The visible toner image is then transferred to the copy sheet by the transfer charging unit 118. Subsequent to the transfer, the cleaning unit 116 cleans residual toner from the photoconductive drum 110, and the pre-exposure lamp 114 removes residual charge from the photoconductive drum 110.

Subsequent to the transfer, the copy sheet is detached from the transfer belt 130, and the toner image is again charged by pre-fixing charging units 139 and 140. The copy sheet is then moved to a fixing unit 141, where the toner image is fixed onto the copy sheet by pressure and heat. The copy sheet is then discharged by a discharge roller 142 out of the apparatus 100.

An attractive charging unit 119 causes the transfer belt 130 to attract the copy sheet moved by the timing roller 137. A transfer roller (not shown) in combination with the attractive charging unit 119 helps the transfer belt 130 to attract the copy sheet by charge.

The apparatus body 100 includes a deck 150 that can accommodate 4000 copy sheets. A lifter 151 of the deck 150 rises in response to the quantity of copy sheets so that a feed roller 152 always remains in contact with a copy sheet. The apparatus 100 also includes a manual insertion feeder 153 that can accommodate 100 copy sheets.

Referring to FIG. 2, a discharge flapper 154 switches the copy sheet path between both-side recording or multiple recording and discharging. The copy sheet moved by the discharge roller 142 is sent to the both-side recording path or the multiple recording path by the discharge flapper 154.

A multiple-recording flapper 157 switches between the both-side recording and the multiple recording. With the multiple-recording flapper 157 inclined leftwardly, the copy sheet is directly guided to an underside transport path 158 without being routed via an inverting path 155.

A feed roller 159 feeds the copy sheet to the photoconductive drum 110 via a path 160. A discharge roller 161, arranged in the vicinity of the discharge flapper 154, discharges the copy sheet that is switched to the discharge side by the discharge flapper 154.

During both-side recording (both-side printing), a copy sheet with one side finished is routed to the inverting path 155, with the discharge flapper 154 raised upward, and the multiple-recording flapper 157 inclined rightwardly. With the multiple-recording flapper 157 inclined leftwardly, the copy sheet passes along the transport path 158 and is stored face down in a recycling paper tray 156. During multiple recording (printing), the copy sheet partly finished is transported along the transport path 158 with the discharge flapper 154 raised and the multiple-recording flapper 157 inclined leftwardly, and is then stored in the recycling paper tray 156. The paper sheets placed in the recycling paper tray 156 are routed along the path 160 to the timing roller 137 of the apparatus 100 by the feed roller 159, one by one from the bottom sheet first.

When the copy sheet is discharged (face down) out of the apparatus 100, the discharge flapper 154 is raised, the flapper 157 is inclined rightwardly, the copy sheet with one side finished is routed to the inverting path 155, moved to a second transport roller 162a by an inverting roller 163 after the back edge of the copy sheet passes a first transport roller 162, and then discharged face down by the discharge roller 161.

Figure 3:
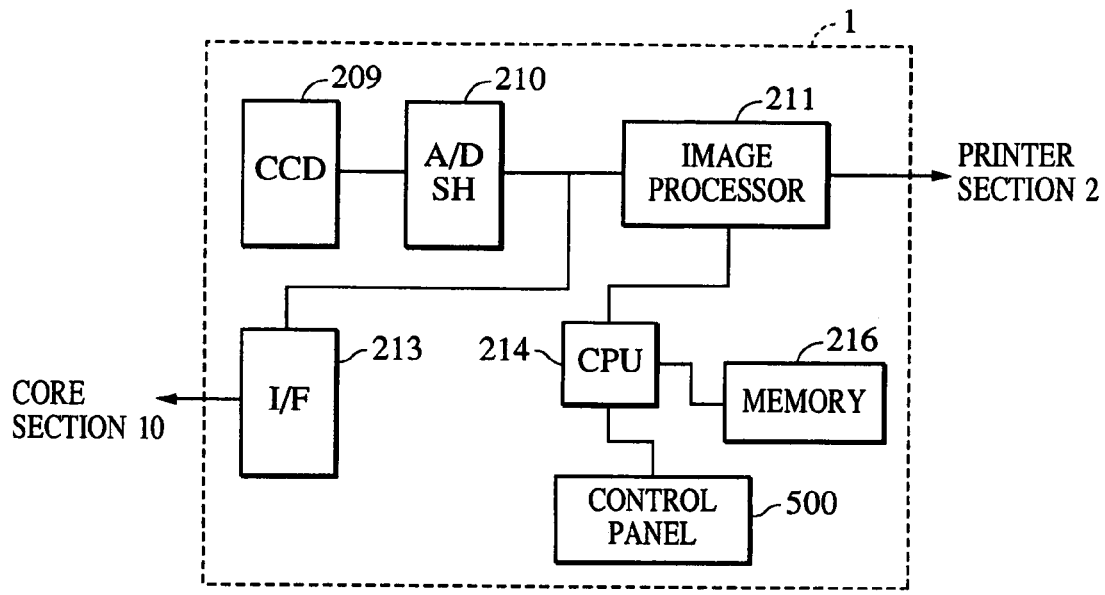
FIG. 3 is a block diagram showing the construction of a reader section.

FIG. 3 is a block diagram showing the construction of the reader section 1. An A/D-SH unit 210 analog-to-digital converts image data output by a CCD 209 while performing shading correction on the image data at the same time. The image data processed by the A/D-SH unit 210 is transferred to the printer section 2 through an image processor 211, while being transferred to the core section 10 in the image input/output controller 3 via an interface (I/F) 213.

A CPU 214 controls the image processor 211 and the interface 213 in accordance with settings input from a control panel 500 on the apparatus 100 shown in FIG. 2. For instance, when the control panel 500 sets a copy mode with trimming process enabled, the image data is sent to the printer section 2 after the image processor 211 performs a trimming process on the image data. When the control panel 500 sets a facsimile transmission mode, the reader section 1 sends the image data and a control command in association with the set mode via the interface 213 to the core section 10. The control program of the CPU 214 is stored in a memory 216, and the CPU 214 executes control referencing the memory 216. The memory 216 also serves as a working area for the CPU 214.

Figure 4:
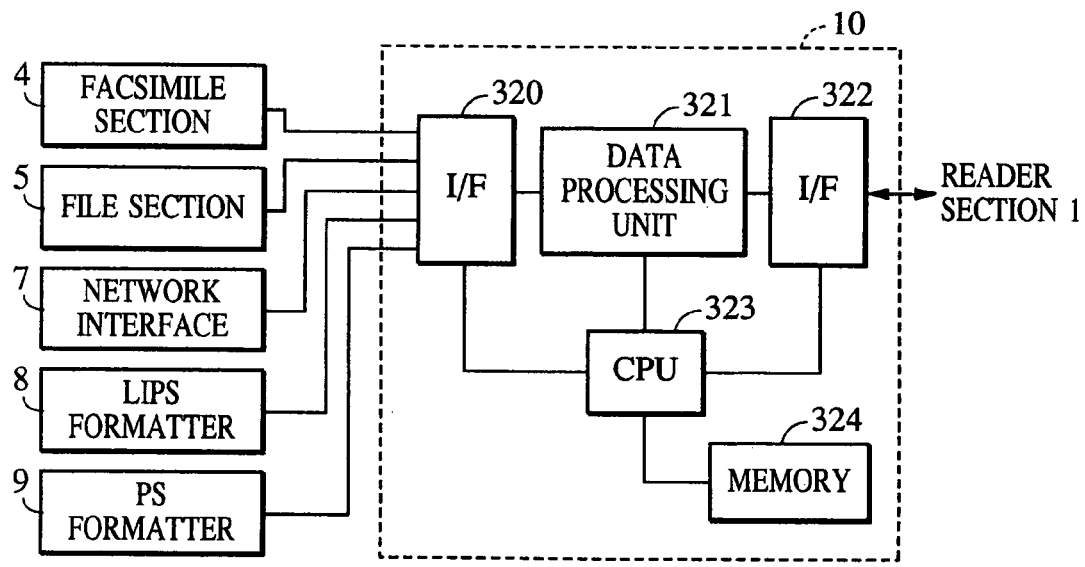
FIG. 4 is a block diagram showing the construction of a core section.

FIG. 4 is a block diagram showing the construction of the core section 10. The reader section 1 sends the image data to a data processing unit 321, and sends the control command to a CPU 323. The data processing unit 321 performs image processings, such as rotation and zooming processes on the image data. The image data sent from the reader section 1 to the data processing unit 321 is transferred to the facsimile section 4, the file section 5, and the network interface 7 via an interface 320 in response to the control command transferred from the reader section 1.

The code data, representing an image, coming in from the network interface 7 is transferred to the data processing unit 321 to determine whether the PDL is LIPS or PostScript, and is then transferred to either the LIPS formatter 8 or the PS formatter 9. The PDL data is then developed into the image data. The image data is sent to the data processing unit 321, and is then sent to the facsimile section 4 or the printer section 2.

The image data from the facsimile section 4 is transferred to the data processing unit 321, and is then transferred to the printer section 2, the file section 5, or the network interface 7. The image data from the file section 5 is transferred to the data processing unit 321, and is then transferred to the printer section 2, the facsimile section 4 or the network interface 7.

The CPU 323 executes the above processes in accordance with the control programs stored in a memory 324 (including programs for performing processes illustrated in FIG. 17 and FIG. 19, as will be discussed later) or the control command coming in from the reader section 1. The memory 324 also serves as a working area for the CPU 323. The network interface 7 is equipped with a database called the MIB (Management Information Base), and manages the printer section 2 by communicating with a computer on the network, using the SNMP (Simple Network Management Protocol).

On a monitor of the image-forming apparatus 1000, on the display unit thereof, information in a personal box managed in another remote digital copying apparatus is displayed by communicating with the network interface 7 of the other remote digital copying apparatus through the TCP/IP protocol. Through the core section 10 of the other digital copying apparatus, the image-forming apparatus 1000 reads original document image data and information associated with the image data in the personal box in a hard disk 257 of an image memory 255, shown in FIG. 5, in the image processor 211 in the reader section 1 in the other image-forming apparatus. The image-forming apparatus 1000 receives the original document image in the TCP/IP protocol via the core section 10 and the network interface 7 of the other digital copying apparatus.

The image-forming apparatus 1000 receives the original document image received from the other digital copying apparatus through the network interface 7, and transfers the original document image to its own printer section 2 through the core section 10 and the reader section 1 to print it out.

In this way, the core section 10 plays a major role in performing combined functions of the reading of the original document image, the printing of the image, the transmission and reception of the image, the storage of the image, and the data input to and output from the computer.

Figure 5:
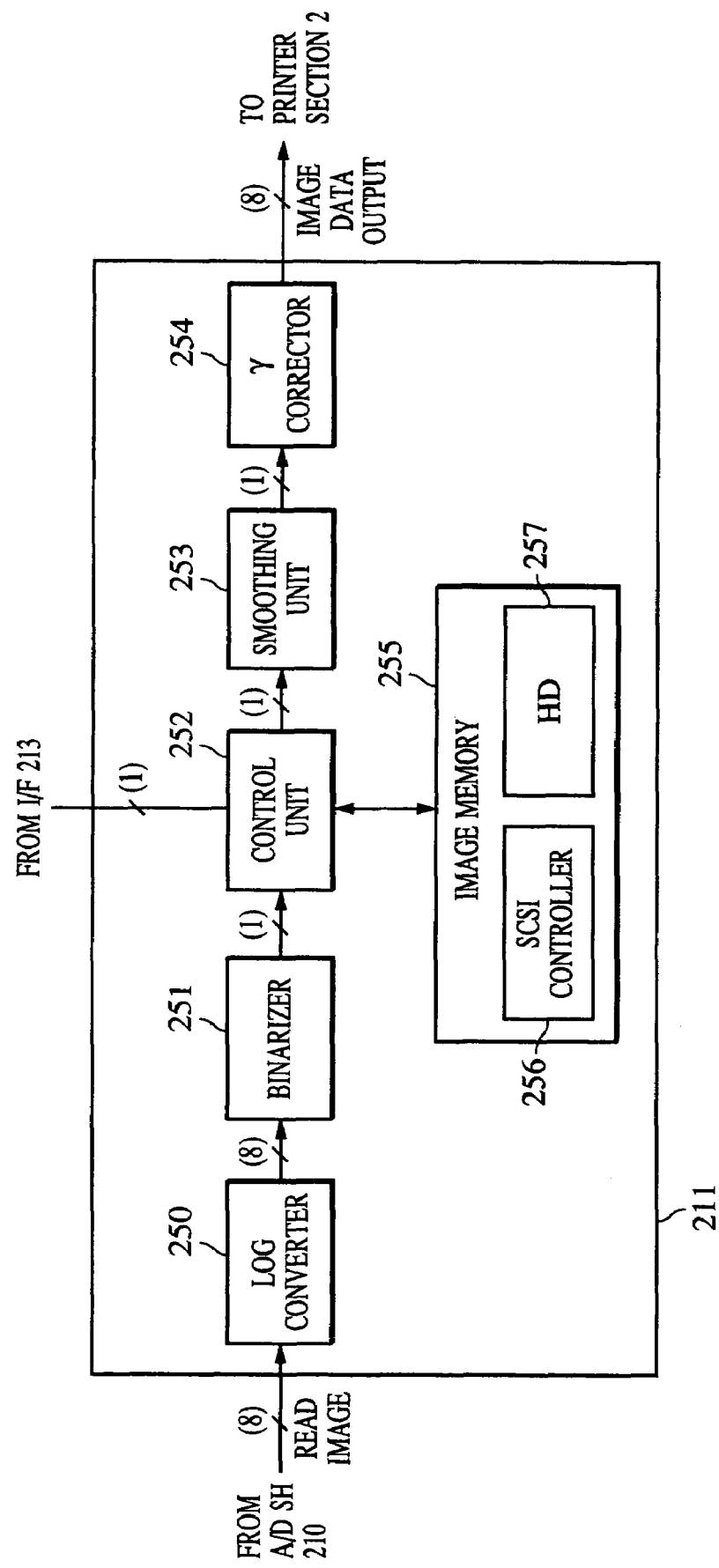
FIG. 5 is a block diagram showing the construction of an image processor.

FIG. 5 is a block diagram showing the construction of the image processor 211 in detail.

The image, which has been analog-to-digital converted and shading-corrected by the A/D-SH unit 210, is input to the image processor 211 as black luminance level data, and is sent to a log converter 250. The log converter 250 stores a LUT (lookup table) for converting the input luminance data into density data. The luminance data is thus converted into the density data by referring to a table value on the LUT corresponding to the input value.

The density data is sent to a binarizer 251. The binarizer 251 binarizes multi-value density data, resulting in a density value of "0" or "255". Since the 8-bit image data is thus converted into 1-bit data having a value of "0"or "1", the quantity of image data to be stored is decreased.

However, if the image is binarized, the number of tonal gradations of the image is reduced from 256 to 2. A photograph having a number of intermediate tonal gradations is substantially degraded. It is therefore necessary to apply pseudo-tonal-gradations to binarized data. An error spread method is used to express intermediate tonal gradations, in binarized data. In this method, the image data is binarized so that the density data thereof is treated as "255" when the density of the image is greater than a threshold, and is treated as "0" when the density of the image is not greater than the threshold. A difference between actual density data and the binarized data is handled as an error signal, which is then spread among pixels surrounding a pixel of interest. The distribution of the error is performed by multiplying the error arising from the binarization by predetermined weighting coefficients on a matrix of pixels, and by adding the multiplication result to the pixel surrounding the pixel of interest. In this way, the average density of the entire image is preserved, and the pseudo-tonal-gradations are thus expressed in binarized data.

The binarized image data is then sent to a control unit 252. The bit-map image data, resulting from the development of the PDL data from the computer, comes from the core section 10. The data is already developed into the binarized image data, through the LIPS formatter 8 or the PS formatter 9, prior to the input thereof to the core section 10, and is directly sent to the control unit 252.

In response to an instruction from the apparatus 100, the control unit 252 stores, in the image memory 255, the image of the document read by the RDF or the document read from the glass platen, and processed through the A/D-SH unit 210 or the bit-map image into which the PDL data is developed through the interface 213. From the image memory. 255, the control unit 252 successively reads and outputs the image data.

The image memory 255 includes a SCSI (small computer systems interface) controller 256 and a hard disk (memory) 257, and writes the image data on the hard disk 257 in response to an instruction from the SCSI controller 256. A plurality of pieces of image data stored in the hard disk 257 is printed out in the order specified in an edit mode input by the control panel 500. For instance, when the PDL images coming in first page first are printed out in reverse order, and electronically sorted, all pages of the PDL bit-map images coming in from a host apparatus are once stored in the hard disk 257, then read in the order of the last page to the first, and printed out. The electronic sorting is performed by repeating this operation a number of times as requested by the host apparatus.

The image data, retrieved from the image memory 255 or not stored in the image memory 255, is sent to a smoothing unit 253. The smoothing unit 253 converts the 1-bit data into the 8-bit data, setting the image data to a "0" state or "255" state.

The converted image data is replaced with a weighted average value that is obtained by respectively multiplying predetermined coefficients in a matrix of pixels by density values of pixels surrounding a pixel of interest and by summing the multiplication results. In this way, binarized data is converted into multi-value data in response to the density values of the pixels in the vicinity of the pixel of interest, and an image having a quality reflecting more the read image is thus reproduced. The smoothed image data is then fed to a γ corrector 254. The γ corrector 254 converts the density data according to an LUT that complies with the characteristics of a printer, and adjusts the output thereof in accordance with the density value set through the control panel 500. The processed image is sent to the printer section 2 to be printed there.

Figure 6:
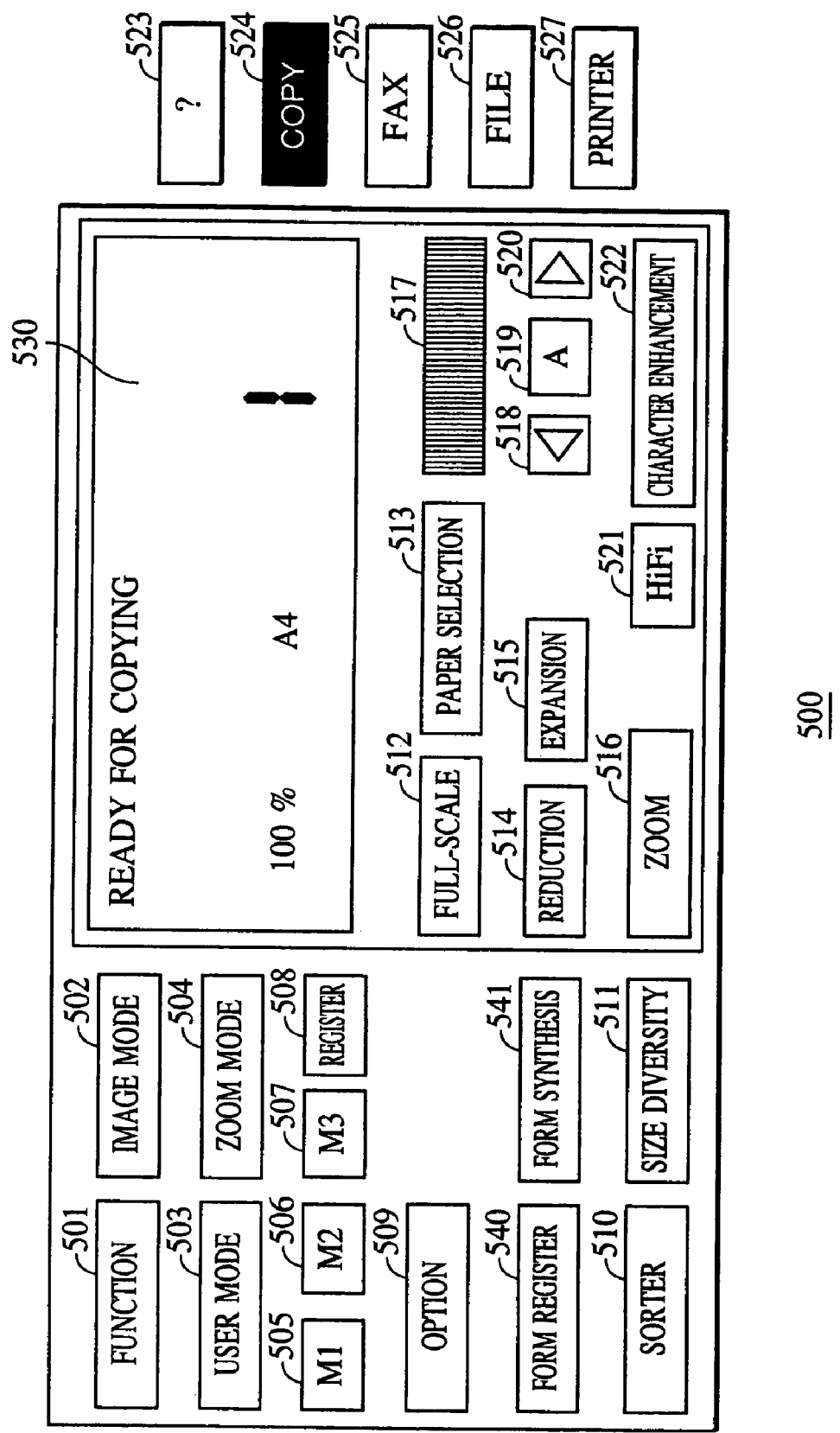
FIG. 6 show a standard screen of a liquid-crystal display panel of a control panel.

FIG. 6 shows the standard screen of a liquid-crystal display panel of the control panel 500.

The screen is a touch panel, and by touching anywhere in a function label key, that function is executed.

A function key 501 is pressed to use expanded functions.

By pressing the function key 501, the copying apparatus is set into a variety of modes including sequential page copying, both-side printing, multi-picture printing, movement, setting of binding margins, outline erasing. When an image mode key 502 is pressed, the copying apparatus goes to setting modes such as for screening, shadowing, trimming, and masking on a copied image. A user mode key 503 sets user working environments, for instance, for ON/OFF of a buzzer, ON/OFF of cassette automatic selection, and automatic density adjustment. A zoom mode key 504 activates a mode in which the image is zoomed independently in the X direction and in the Y direction, or a mode in which a zooming rate is calculated from the size of the original document and the size of a copy sheet.

M1 key 505, M2 key 506, and M3 key 507 are used to call a mode memory respectively registered. A register key 508 is pressed to register a current copy mode in each of the mode memories.

An option key 509 is used to set optional functions, such as in a film projector through which a copying operation is directly performed from films. Also, the option key 509 is used to input settings for personal preference.

A sorter key 510 is used to input a setting of whether to select between a mechanical sorter and an electronic sorter, and the mode of the sorter for sorting or grouping.

A size diversity key 511 is pressed to set documents of sheet sizes of A4 and A3 together or sheet sizes of B5 and B4 together in the document feeder.

A full-size key 512 is pressed to set copying scale to 100%. A reduction key 514 and an expansion key 515 are respectively pressed to reduce and expand the document image.

A zoom key 516 sets a zooming rate within 25 to 800%, for instance. A paper selection key 513 is pressed to select copy sheets. Each time a density key 518 is pressed, the density of the copied image is increased. Each time a density key 520 is pressed, the density of the copied image is decreased. A density indicator 517 shifts the indication thereof leftwardly or rightwardly each time the density key 518 or 520 is pressed. An A key is an automatic density adjustment key to copy a document, such as newspaper, which has dense background.

A HiFi key 521 is used to copy an original, such as a photograph, which has a great deal of halftone images. A character enhancement key 522 enhances characters in the copying of a text document.

When the function of a certain key is unknown, a guide key 523 is pressed and the description of the key is provided on a screen 530.

A copy key 524 is pressed to perform the copying operation. Press this key, and the standard screen shown in FIG. 6 will appear.

A fax key 525 is pressed to transmit a facsimile. A file key 526 is pressed when the user wants to output file data. A printer key 527 is pressed to change the density of the printout or to reference the printout result of the PDL image from a remote host apparatus.

A form register key 540 stores the image of an original set in the RDF as a form image onto a form area in the hard disk 257.

A form synthesis key 541 selects a plurality of form images stored in the form area in the hard disk 257, and OR-gates the selected form image and the image of the original set in the RDF for synthesis, and prints out the ORed images.

Figure 7:
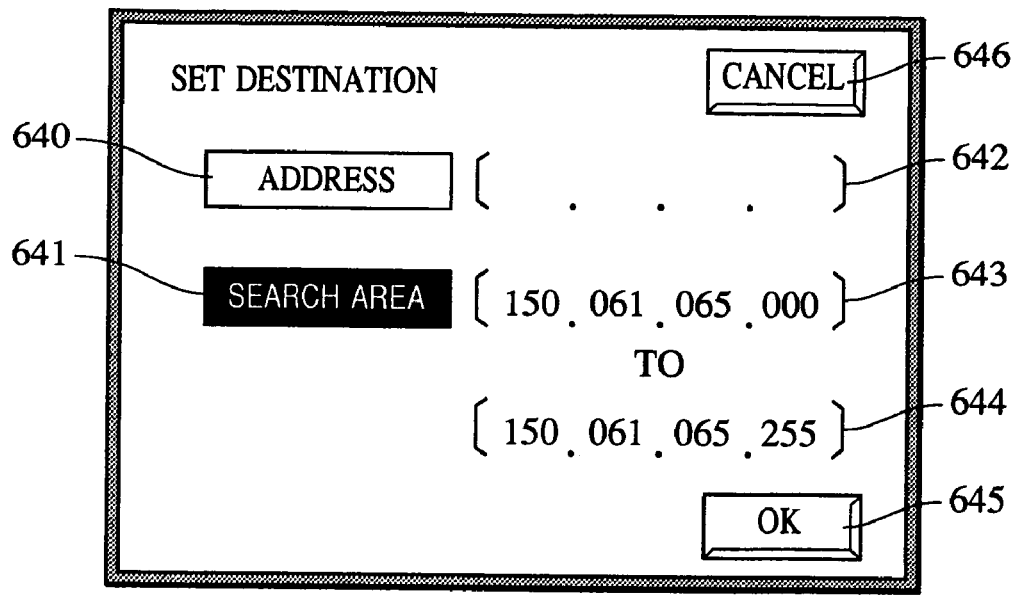
FIG. 7 shows a screen of the control panel for selecting another image-forming apparatus.

FIG. 7 shows a screen of the control panel 500 to select the other image-forming apparatus to read, through a network, the image of an original stored in a personal box in a hard disk in the other remote image-forming apparatus.

When an image-forming apparatus is installed and used for the first time, the manager of users sets, through the control panel 500, the other image-forming apparatuses from which the original document images can be read from the personal boxes.

After pressing a manager key (not shown), the manager enters a password using numeric keys. If the password matches the manager password stored in the memory 216 in the image-forming apparatus, the image-forming apparatus displays a manager screen (not shown). Press a "group apparatus acquisition" key, and the screen shown in FIG. 7 appears.

An address key 640 is pressed, displaying the key label in reverse video. An IP address of the other image-forming apparatus on the network with which the original document images are exchanged is input using the numeric keys. For instance, when the IP address of the other image-forming apparatus on the network is 150.61.65.9, an OK button 645 is pressed after entering these numbers. Communication with the other image-forming apparatus starts through the TCP/IP protocol. The image-forming apparatus first sends a command to the partner image-forming apparatus querying whether the partner is the image-forming apparatus. If the partner is the image-forming apparatus, the partner image-forming apparatus responds by sending information including the name thereof, the model thereof, the free capacity of a hard disk, and further information of whether copying is now in progress. Receiving these pieces of information, the image-forming apparatus 1000 determines whether there exists another image-forming apparatus with which data communication is possible. If there exists another image-forming apparatus, the image-forming apparatus 1000 acquires the information about that image-forming apparatus.

The user presses a search area key 641, displaying the key label thereof in reverse video. Using the numeric keys, the user designates the area of the IP address within which other image-forming apparatuses, with which original document images are exchanged, are searched for. The search area key 641 is useful when the IP address of the other image-forming apparatus is unknown, when there is a plurality of image-forming apparatuses within the IP address range, or when the user wants to select one from the image-forming apparatuses, with which the original document images are exchanged.

A search area start address window 643 is used to designate the IP address with which the searching of the other image-forming apparatuses starts. A search area end address window 644 is used to designate the IP address with which the searching of the other image-forming apparatuses ends. The searching starts with the start IP address designated by the search area start address window 643 and ends with the end IP address designated by the search area end address window 644.

Specifically, when the other image-forming apparatuses with which the original document images are exchanged, ranges from a start IP address of 150.61.65.000 to an end IP address of 150.61.65.255, these numbers are input through the numeric keys. The OK button 645 is pressed and the image-forming apparatus 1000 sends a command to query at the IP address of 150.61.65.000 in the TCP/IP protocol whether the partner is an image-forming apparatus.

When the partner replies or sends no replay for a certain duration of time, the IP address is incremented to 150.61.65.001, 150.61.65.002, . . . , and reaches the end IP address 150.61.65.255. For each IP address, the respective partner, if an image-forming apparatus, returns to the image-forming apparatus 1000 a reply about the partner's own name, the model thereof, the free capacity of the hard disk, and the information about whether a copying operation is in progress. The image-forming apparatus 1000 receives these pieces of information, and determines whether there are other image-forming apparatuses capable of data communications, and acquires the information about the other image-forming apparatus, if any.

A cancel key 646 is pressed to cancel the search for another image-forming apparatus that is network-linkable.

Figure 8:
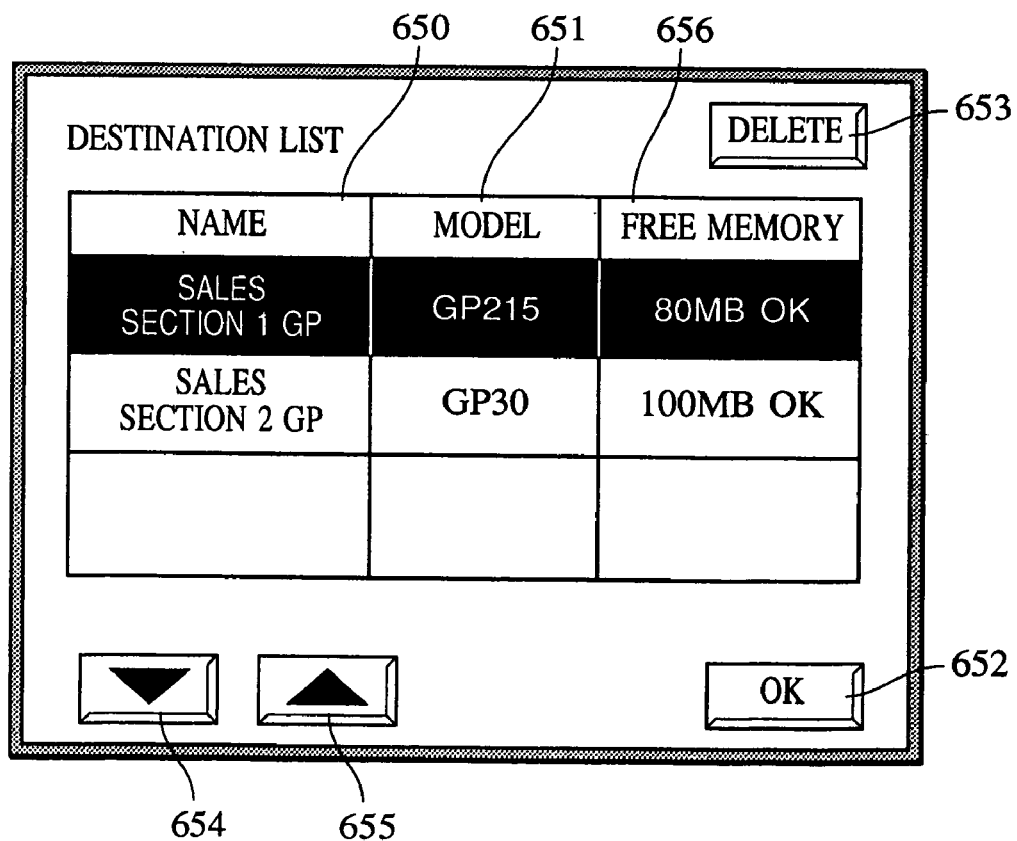
FIG. 8 shows a screen of the control panel showing a destination list.

FIG. 8 shows a destination list shown on the screen of the control panel 500, based on a reply to the query placed on the screen shown in FIG. 7, and received from the other image-forming apparatus. With the OK button 645 pressed on the screen shown in FIG. 7, the partner sends the reply in the TCP/IP protocol telling that the partner is an image-forming apparatus, and the name and model of the apparatus, and the free capacity of the hard disk.

A name window 650 displays a name, registered in a RAM by the user, in the partner image-forming apparatus which is found by designating the address on the screen shown in FIG. 7 through communication at the TCP/IP protocol, or by designating the search area of the addresses. The screen shown in FIG. 7 indicates that the image-forming apparatus 1000 successfully communicates with two copying apparatuses having respective names "general affairs section GP" and "sales section 2 GP" as a result of the searching within the designated search area.

A model window 651 displays the model name of the partner image-forming apparatus registered in the respective ROM. Referring to FIG. 8, the image-forming apparatus having the name "general affairs section GP" has the model name "GP215", and the image-forming apparatus having the name "sales section 2 GP" has the model name "GP30".

A hard disk information window 656 indicates the free memory capacity of the hard disk of the partner image-forming apparatus. For instance, the hard disk of the image-forming apparatus named "general affairs section GP" has a free memory capacity of 80 MB with the OK label, and the hard disk of the image-forming apparatus of the sales section 2 GP has a free memory capacity of 100 MB with the OK label. (If no free memory capacity is available, the label NG is presented).

A downward scroll key 654 is pressed to see the next page for further list of names and models. An upward scroll key 655 is pressed to see the previous page for the list of the names and models.

A delete key 653 is pressed to select and then delete an image-forming apparatus with which the user does not wish to exchange the original document images (with data communication disabled), from among the linked image-forming apparatuses (with data communication possible). For instance, when the user does not wish to exchange images with the copying apparatus of the sales section 1 GP, the user touches the line indicating the apparatus, displaying the line in reverse video, and presses the delete key 653. The user thus deletes the SALES SECTION 1 GP from the list, and deselects the copying apparatus of the sales section 1 GP as the apparatus for exchange of the original document images.

An OK key 652 is pressed, thereby permitting to communicate the exchange of the original document images, the copying apparatuses listed in the destination list, namely, the sales section 1 GP and the sales section 2 GP in FIG. 8. For instance, a user's own digital copying apparatus named general affairs section GP may attempt to print data stored in the personal box in response to a command from the control panel 500, but cannot print because someone else is using the user's own digital copying apparatus. In such a case, the control unit in the sales section 1 GP or the sales section 2 GP, as the other copying apparatuses, can retrieve the image from the personal box in the hard disk of the general affairs section GP currently in use through the network, and the copying apparatus in the sales section 1 GP or the sales section 2 GP can execute printing.

Figure 9:
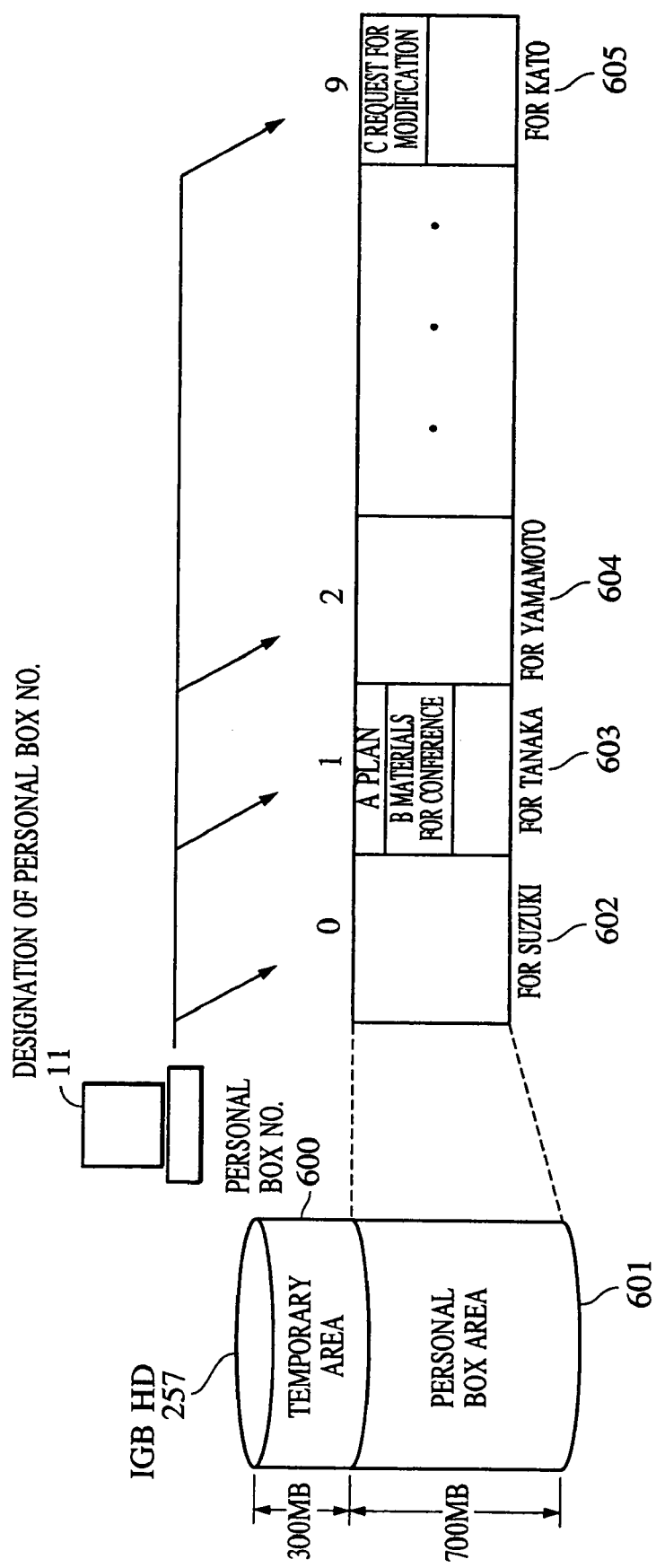
FIG. 9 diagrammatically shows a personal box.

The personal box in the first embodiment is discussed, referring to FIG. 9.

The hard disk 257 in the image memory 255 is partitioned into a temporary area 600, and a personal box area 601. The temporary area 600 temporarily stores the image data for electronic sorting, and erases the image data at the end of the job. The personal box area 601 stores the image data, into which the PDL image received from the PC/WS 11 as a host apparatus is developed by the external interface, in association with the personal box number designated by the PC/WS 11. The user later prints out the image which is developed from the PDL image, and which is stored in the personal box 601 having the user's own personal box number, using the control panel 500.

For instance, a 1 GB hard disk may be partitioned into a temporary area of 300 MB and a personal box area of 700 MB. When the number of personal boxes is ten, the area of 700 MB is further partitioned into ten 70 MB subareas.

Each personal box is numbered. For instance, boxes 602, 603, 604, and 605 are respectively designated with box numbers 0, 1, 2, and 9. For instance, referring to FIG. 9, the box for Tanaka is numbered with 1. When a user called Tanaka wants to enter a PDL document from the PC/WS 11 into his or her own box, the user designates the box number 1 on UI in the PC/WS 11, and transmits the image data to the image-forming apparatus 1000.

When the user named Tanaka inputs his or her own PDL document from the PC/WS 11 to someone else's box, for instance, the box of a user named Kato, Tanaka designates the box number on the UI in the PC/WS 11, of the partner to whom Tanaka wants to send the document, in this case, box number 9. In this way, the user's own PDL document may be mailed to someone else's box.

Figure 10:
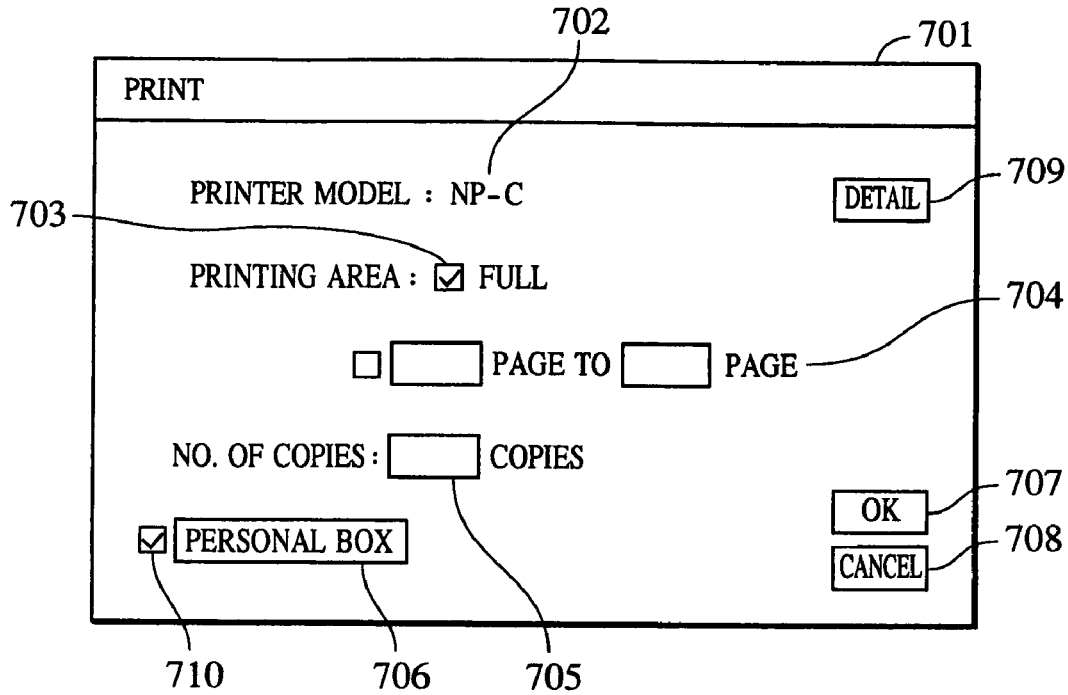
FIG. 10 shows a window for designating personal boxes.

FIG. 10 shows a screen 701 presented on the display unit of the PC/WS 11 which prints out document data on an application software program or designates a personal box.

The print screen 701 is displayed when a print command is set on a menu of the application software program. A printer model 702 is the model name of the printer currently in use, and is the model name of the digital copying apparatus connected via the network in this embodiment. A printing area window 703 is used to enter settings of whether all document pages to print or to input into a personal box, and of from what page to what page of the document to print or to input into a personal box. To designate the document pages all or in part, the corresponding square marks are checked by clicking a mouse.

A number of copies window 705 is used to enter settings of how many copies to print, or how many copies to print later in case of transferring the document data into the personal box. A personal box window 710 is used to input the document data into the personal box in accordance with the setting on a personal box screen to be discussed later.

To input the document data in the personal box, rather than printing the document data, check the corresponding square mark by clicking the mouse. When the square mark is unchecked by clicking the mouse, the normal printing is performed.

The personal box setting window 706 designates a personal box number to be discussed later. A detail button 709 is pressed to go to a screen (not shown) for setting a detailed operation mode for a print job, and enters the setting on the screen, for example, for printing resolution, the size of an original document, and enable/disable of sheet processing mode for stapling. When an OK button 707 is pressed, the setting input is terminated. The printing now starts or the transfer of the document into the personal box with a specified box number starts. A cancel button 708 is pressed to cancel the settings for the printing or the personal box and to close the print screen 701.

Figure 11:
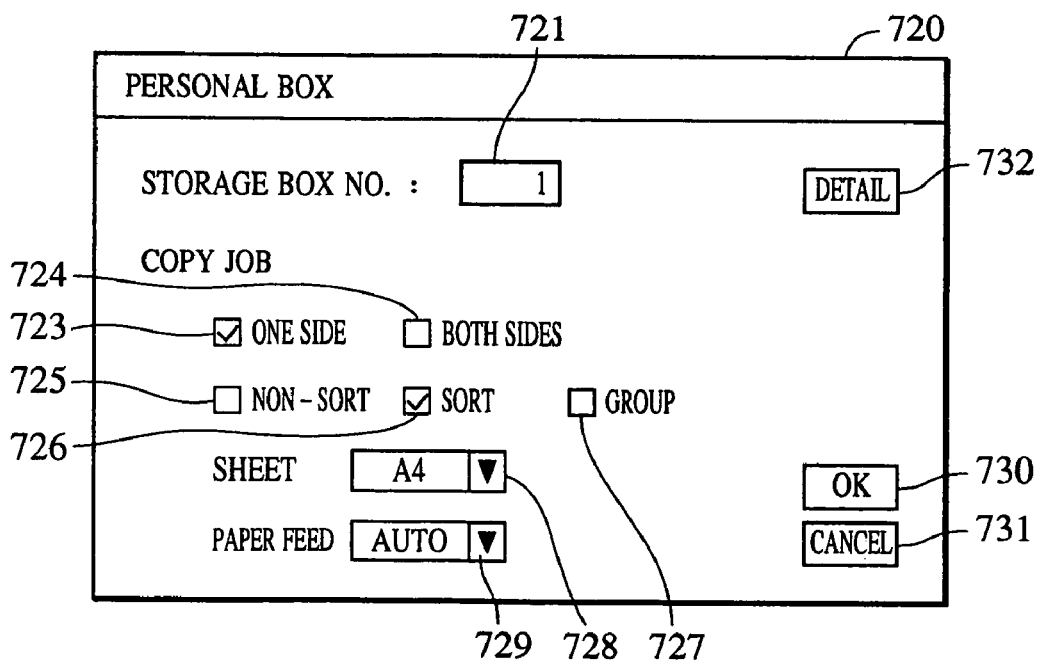
FIG. 11 shows a personal box window.

FIG. 11 shows the personal box screen which is opened by pressing the personal box setting button 706 on the print screen 701 to print the document data on an application software program on the PC/WS 11 or to designate the personal box.

The personal box screen 720 specifies the personal box number of the hard disk of the electronic sorter in a digital copying apparatus, the document data on the application program is stored, and sets the copy mode the user later prints the document data on the digital copying apparatus (i.e., printing settings, such as one-side printing or both-side printing, sorting process, such as non-sorting, sorting, or grouping, and size settings, such as the size of the original document, the sheet size of the copy sheet, etc.).

A personal box number window 721 is used to designate 1 as a user's own box number, for instance, when a user called Tanaka wants to store the document data in his or her own box, as shown in FIG. 11. When the user called Tanaka wants to transfer the document data to a user called Kato, Tanaka designates the box number 9, which is the box for Kato. In this case, no password input is required as in ordinary electronic mail.

A one-side printing setting window 723 is checked by clicking the mouse to print later the document data stored in the personal box in a one-side printing fashion. A both-side printing setting window 724 is checked by clicking the mouse to print later the document data stored in the personal box in a both-side printing fashion.

A non-sorting setting window 725 is checked by clicking the mouse to print later the document data stored in the personal box in a non-sorting fashion. A sorting setting window 726 is checked by clicking the mouse to print later the document data stored in the personal box in an electronic sorting fashion. A sorting setting window 727 is checked by clicking the mouse to print later the document data stored in the personal box in a group printing fashion.

A sheet setting window 728 sets the size of the sheets that are used to print later the document data that is stored in the personal box. For instance, clicking a downward looking arrow on the right-hand side by the mouse, the sheet sizes A4, A5, B4, and the like are successively displayed for selection. A cassette stack selection window 729 is used to select a copy sheet cassette to print the document data stored in the personal box. Clicking a downward looking arrow on the right-hand side by the mouse, the labels for a top cassette and a bottom cassette are displayed for selection. If "AUTO" is selected, the cassette having the copy sheets complying with the specified sheet size is automatically selected.

A detail setting button 732 is used to perform reduction copying such as a 2-in-1 reduction layout (with two original document pages arranged side by side to be printed onto a single copy sheet) or a 4-in-1 reduction layout (with four original document pages arranged to be printed onto a single copy sheet). An OK button 730 is pressed to validate the settings about the personal box when the input of the settings is complete. Subsequent to the pressing of the OK button 730, the apparatus returns to the print screen 701 shown in FIG. 10. With the OK button 707 pressed, the document on the application software program starts to be transferred into the designated personal box in the digital copying apparatus. A cancel button 731 is used to cancel the settings about the personal box, and to return to the print screen 701.

As discussed above, in the first embodiment, the PC selects between the two options, namely allowing the image-forming apparatus to immediately print the image data, i.e., the output thereof, or to store in the hard disk in the image-forming apparatus rather than immediately printing the image data. When the print job is stored in the hard disk of the image-forming apparatus, the user designates which personal box to store it in, from among the plurality of the personal boxes of the image-forming apparatus. In this case, the operation mode of the print settings of the image data to be stored is designated. The user thus stores desired image data (file) at a desired personal box in association with operation mode data designated by the user on the PC (the operation mode data includes a diversity of setting data about print pages, number of copies, one-side printing or both-side printing, sorting, reduction layout, the size of original documents, the sheet size of copy sheets, etc.).

Figure 12:
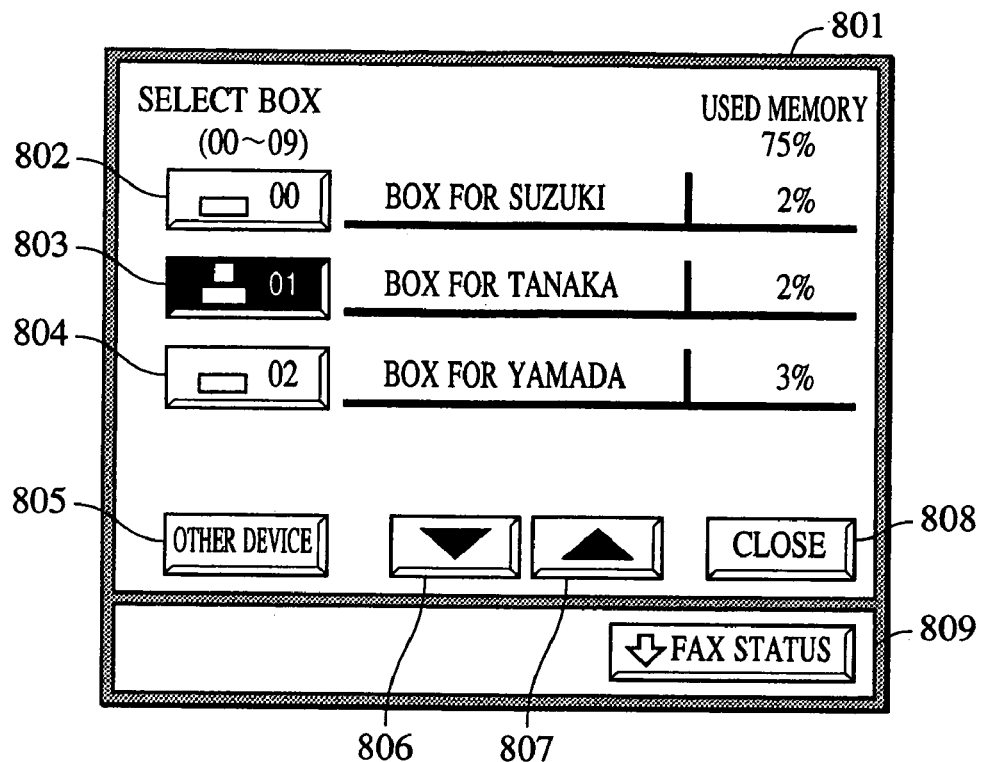
FIG. 12 shows a personal box main screen.

FIG. 12 shows a main screen 801 of the personal box on the control panel 500.

The main screen 801 is the one for the personal box on the control panel 500 in the image-forming apparatus 1000, and is opened by pressing a PB (personal box) key (not shown) on the control panel 500. As shown, there are ten personal boxes numbered from 00 through 09, and the PDL data, from a host apparatus, in a raster image developed by the electronic sorter (i.e., in a bit-map state), is stored in respective personal boxes in the hard disk 257.

On the screen of the control panel 500, each personal box number is named, although not really labeled on the actual screen. For instance, the personal box number 01 is tagged with "Box for Tanaka", and indicates that box is used by Tanaka. A percentage indicator on the rightmost of the line of each box indicates the percentage of memory used by that personal box to the memory capacity of the entire personal box area in the hard disk. For instance, the box number 01 uses 2% or about 14 MB, of the personal box area memory capacity of 700 MB in the hard disk.

A button 802 is used to monitor a job (document file) stored in the box number 00. Similarly, buttons 803 and 804 are used to monitor jobs respectively stored in the box numbers 01 and 02. As shown in FIG. 10 and FIG. 11, when Tanaka transfers application document data to his or her own box 01 from a host computer, Tanaka later presses the button 803 for the box number 01 on the main screen 801 of the personal box on the control panel 500 to start printing the document.

Scroll keys 806 and 807 are pressed to scroll through the names and used memory capacities for the box numbers 00 through 09. A close key 808 is pressed to close the personal box main screen 801 and to return to the standard screen shown in FIG. 6. A fax status key 809 is pressed to monitor facsimile transmission and reception status Designated 805 is an other device key. A host computer transfers PDL data into a personal box of a copying apparatus, for instance, an image-forming apparatus named "general affairs section GP". If the user requests the output of the data from the personal box, the copying apparatus may be unable to immediately reply to the request (unable to print out the data). The copying apparatus may be currently used by someone else, in trouble, running out of toner, or in memory full state. Under this circumstance, the other device key 805 is a very useful key. By pressing the other device key 805 on the control panel 500 of the other copying apparatus, for instance, the image-forming apparatus named "sales section 1 GP", the user monitors the content in the personal box in the image-forming apparatus of the general affair section GP currently used by someone else, through the control panel 500 on the image-forming apparatus of the sales section 1 GP (in other words, under a circumstance that the request is not immediately honored, even when a request is made to output data in the personal box controlled by a user's own image-forming apparatus). The user thus retrieves the original document data from the personal box of the general affairs section GP through a data communication line, and prints the original document data on the image-forming apparatus the sales section 1 GP.

Subsequent to the pressing of the key 805, the apparatus goes to a screen shown in FIG. 16, to be discussed later.

It is here assumed that both the general affairs section GP and the general affairs section 1 GP are set-up as being mutually connectable for communication as already discussed with reference to FIG. 7 and FIG. 8.

Figure 13:
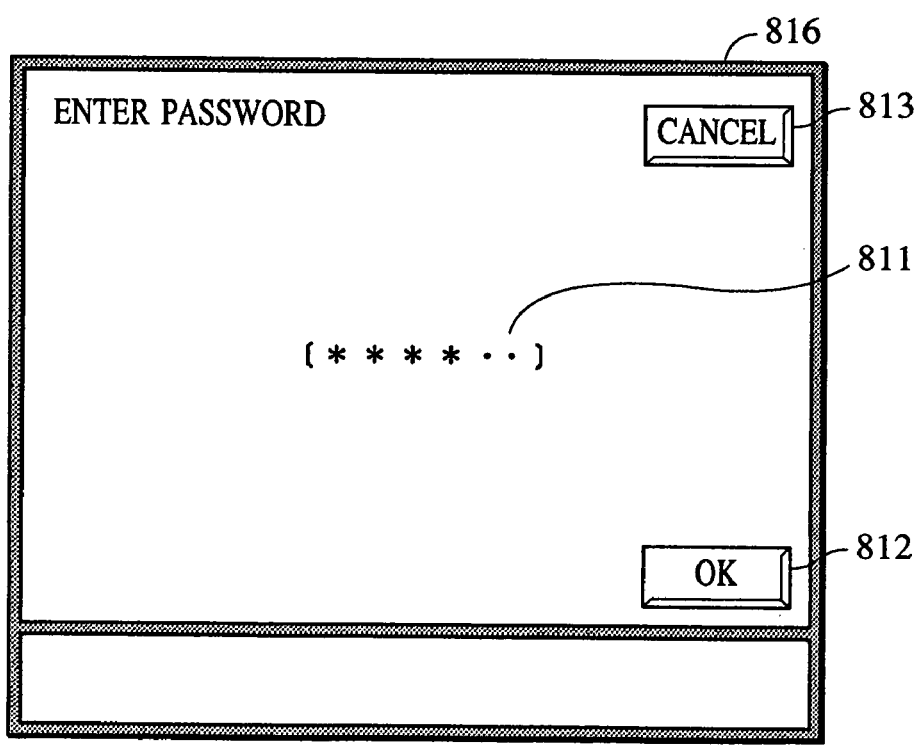
FIG. 13 shows a password input screen of the control panel.

FIG. 13 shows a password input screen 801 on the control panel 500.

The password input screen 816 appears when any button corresponding to the personal box storing desired print data, from among the box numbers 802–804, is pressed on the personal box main screen 801 shown in FIG. 12. A password is entered on the main screen 816 shown in FIG. 13 to print out the document data stored in the personal box selected from the plurality of the personal boxes on the screen shown in FIG. 12 (or FIG. 16 as will be discussed later). Using the numeric keys, the password corresponding to the selected personal box is entered on the control panel 500. The password is six-digit number, for instance. Any already entered digit is shown in an asterisk, while a digit remaining to be entered is shown in a dot mark so that someone else may not see over the user's shoulder.

The password requested on screen for monitoring or printing the document data in the personal box is managed box by box, and one password is issued for one personal box.

The password information is associated with the respective personal box in the memory in own apparatus, and may be managed in a table form, for instance.

Now, a user named Tanaka transfers application document data for storing in the box number 01 from the computer. Tanaka presses the button 803 for own box 01 on the main screen 801 on the control panel 500, and then enters the password on the screen 816 (the password corresponding to the box number 01), and the printing of the document now starts (as will be discussed later with reference to FIG. 14).

In this way, the PDL, which may require secrecy, is printed when the user is personally standing beside the control panel 500. Security of the PDL is thus assured. As already discussed, the user may transmit the PDL document created by the user himself or herself to a personal box of the other person, who may then print the PDL document entering the other person's own password. A mailing system is thus established.

An OK key 812 is pressed to authenticate the password just input. A cancel key 813 is pressed to cancel the input password, and thus to return to the main screen 801.

To perform authentication on an owner of the personal box, codes in a magnetic card owned by each individual may be read through a card reader (not shown) in the copying apparatus.

Figure 14:
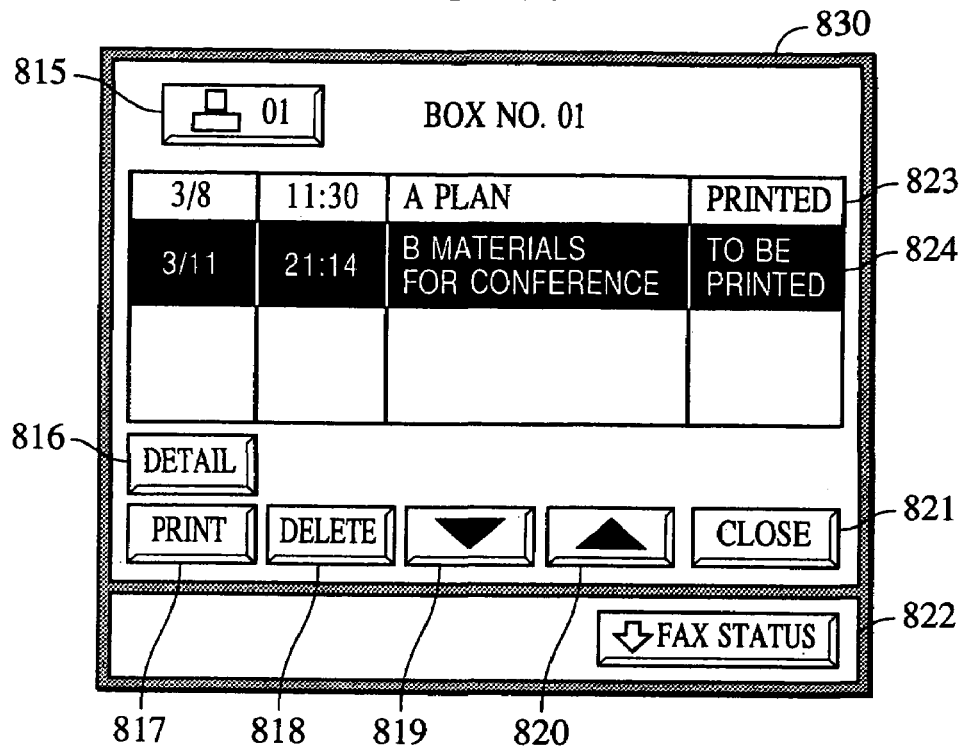
FIG. 14 shows a job display screen of the control panel.

FIG. 14 shows a job display screen 830 for a job stored in one personal box. The job display screen 830 shown in FIG. 14 is presented in response to the password which has been entered on the screen shown in FIG. 13 and corresponds to the box selected on the main screen 801 shown in FIG. 12.

A button 815 is used to monitor the content in the box 01. The job display screen 830, displaying the job stored in the personal box, appears when the password is authenticated and the OK key 812 is pressed on the screen shown in FIG. 13. For instance, the user named Tanaka, who owns the box 01 and is the only person who knows the password, enters the password for authentication, and the job display screen 830 appears.

Windows 823 and 824 show the respective jobs in which the host apparatus inputs the PDL document by designating the personal box numbers. For instance, the window 823 shows that the host apparatus input the document "A plan" to the personal box at 11:30, March 8. The label "printed" on the rightmost column in the window 823 shows that the document has already been printed at least once since the document was entered into the personal box. Other labels may be displayed, for instance, "NG" shows that the transfer of a document to a box has been unsuccessful because of memory full in the hard disk.

A window 824 shows that the host computer (the source of the image data) transferred the document "B materials for conference" to this box 21:14, March 11. The label "to be printed" on the rightmost column on the window 824 shows that the document has never been printed since the document was input, and that printing is possible. By touching this line, the line for this job is displayed in reverse video. In this way, the user selects the job to be printed from among the jobs within the personal box by touching the corresponding window.

A detailed information key 816 is used to present the detail of the job shown in reverse video. Press the detailed information key 816, and the apparatus presents the corresponding job information set on an application program on the print screen of the host apparatus, for instance, "copying for three copies, on A4 sized sheets, in a one-sided printing fashion". The user may modify the job information on the job display screen 830, for instance, modifying the number of copies from three to five. The user may also modify the job information on a page by page basis, for instance, setting page printing range of a plurality of pages of a document with first page to sixth page for full-size copying, and seventh page to tenth page for 4-in-4 layout copying (as will be detailed later with reference to FIG. 18).

A print key 817 is used to start printing the print data of the job on the line shown in reverse video, stored in a raster image. The print data is printed in accordance with the settings of the print job designated by the user (verified by the detailed information key 816) through the UI shown in FIG. 10 or FIG. 11 of the apparatus, which is a source of the print data, such as the host computer. A delete key 818 is pressed to delete the job on the line displayed in reverse video. Upward and downward scroll keys 819 and 820 are also arranged to scroll through the information when the number of jobs is too many to be displayed in one page of screen. A fax status key 822 is pressed to monitor the status of facsimile transmission and reception. A close key 821 is pressed to return to the personal box main screen 801 shown in FIG. 12.

Figure 15:
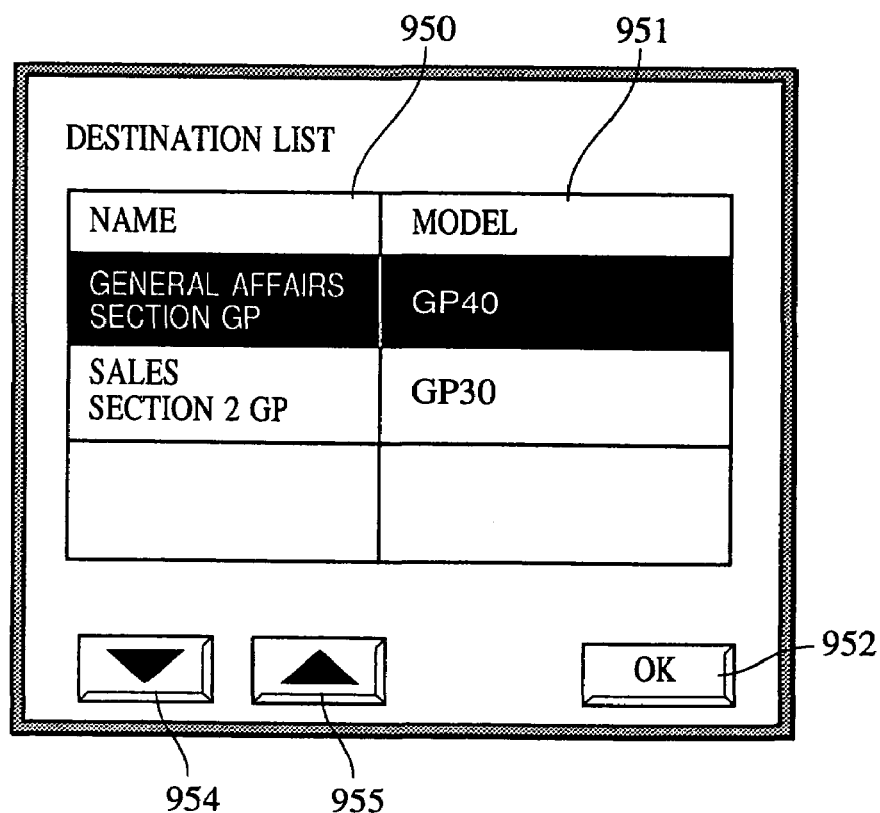
FIG. 15 shows a setting screen of the control panel for printing out document image data of the other apparatus.

FIG. 15 shows a screen of the control panel 500, which appears when the user presses the other device key 805 on the main screen 801 shown in FIG. 12. In response to the pressing of the other device key 805, a CPU 323 searches for other image-forming apparatuses which can exchange data with the image-forming apparatus 1000 and displays the search results on a list on the screen. The user, who has pressed the other device key 805, selects an image-forming apparatus having a personal box storing a desired job, referencing the screen shown in FIG. 15, looks into the personal box of the selected apparatus, selects desired original document image data, transfers the original document image data from the image-forming apparatus selected in FIG. 15 to the user's own apparatus 1000 through the network, and prints out the original document image data on the user's own apparatus 1000.

Assuming that the user's own apparatus 1000 is an image-forming apparatus of the sales section 1, the other image-forming apparatuses that communicate with the user's own apparatus 1000 are the image-forming apparatus of the general affairs section GP and the image-forming apparatus named "sales section 2 GP" as shown in the screen in FIG. 15. The search results are thus displayed on the control panel 500 of the image-forming apparatus 1000 of the sales section 1.

The user transfers the PDL data from the host apparatus to the personal box of the general affairs section GP. When the printing of a desired job is not possible on the general affairs section GP because it is used by someone else, the sales section 2 GP may be used. The user monitors the personal box in the general affairs section GP from the control panel 500 on the sales section 1 GP through the network, and prints out the desired job, stored in the personal box in the general affairs section GP, on the printer of the sales section 1 GP.

A destination list window 950 displays the destination names the users have registered in the RAMs of the partner image-forming apparatuses that are obtained by designating addresses and performing TCP/IP communications, or by designating an address search area, on the screen shown in FIG. 7. FIG. 8 shows the result of the search performed by the general affairs section GP, and FIG. 15 shows the result of the search performed by the sales section 1 GP, listing the general affairs section GP and the sales section 2 GP. FIG. 15 thus shows on screen the general affairs section GP and the sales section 2 GP as the destinations.

A model name display window 951 shows the model names registered in the ROMs of the respective partner image-forming apparatuses. Referring to FIG. 15, the general affairs section GP has a GP40 copying apparatus, and the sales section 2 GP has a GP30 copying apparatus. A downward scroll key 954 is pressed to call a next page of lists of names and models. An upward scroll key 955 is pressed to show a previous page of lists of names and models.

An OK key 952 is pressed to enter the name of the copying apparatus listed in the destination table, here the general affairs section GP in FIG. 15, to monitor the content of the personal box thereof through the network. For instance, the user now tries printing the print data stored in the personal box of the digital copying apparatus of the general affairs section GP, by a command input through the control panel 500 of the general affairs section GP. If the image-forming apparatus is currently used by someone else, the user retrieves the image from the personal box in the hard disk in the general affairs section GP currently being used by someone else, through the network, using the control panel 500 of another image-forming apparatus, i.e., of the sales section 1 GP. The user then prints out the document on the copying apparatus of the sales section 1 GP.

Figure 16:
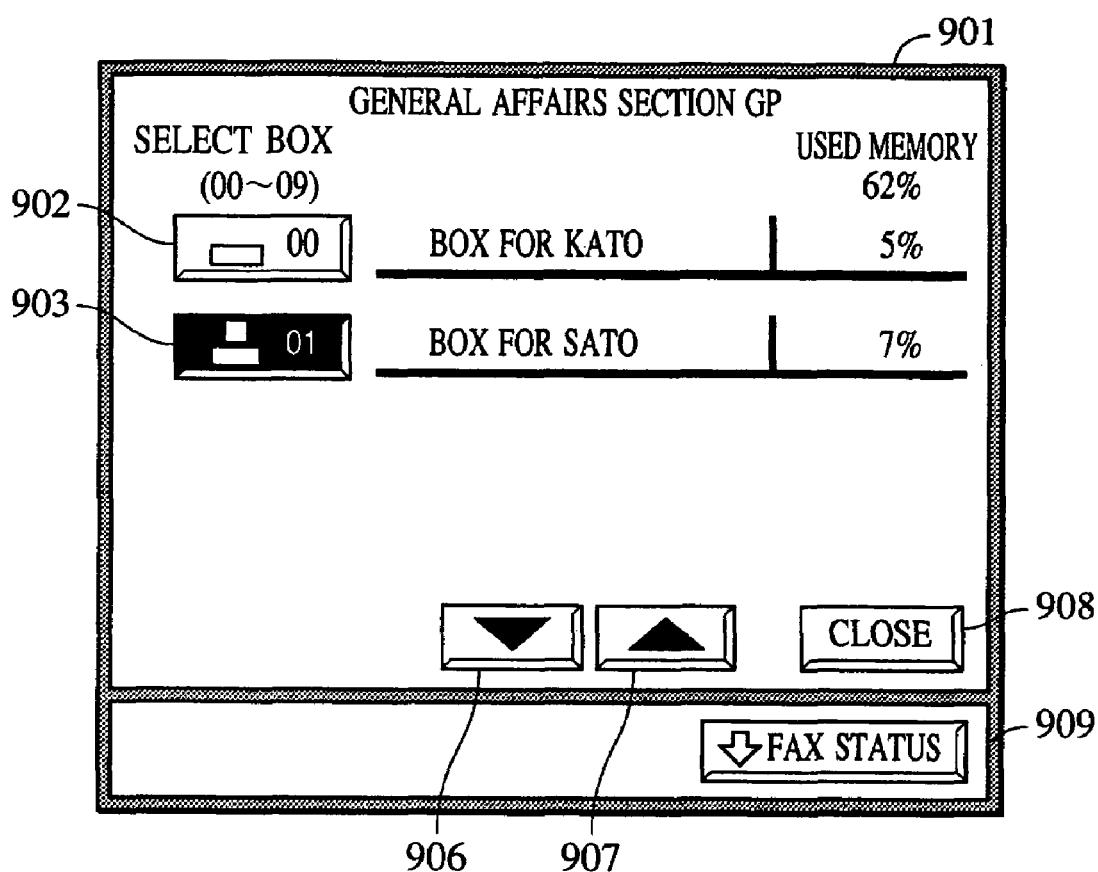
FIG. 16 shows a display screen of a personal box in another apparatus that the user monitors through his own apparatus.

FIG. 16 shows a display screen 901 presented on the control panel 500 on the image-forming apparatus of the sales section 1 GP. The display screen 901 appears when the user looks into the personal box on another copying apparatus through the network by pressing the OK key 952 on the screen shown in FIG. 15 (on the screen on the control panel 500.of the image-forming apparatus listing "sales section 1 GP").

The screen 901 is a main screen which is opened when the OK key 952 shown in FIG. 15 is pressed to look into the personal box of another copying apparatus, i.e., of the general affairs section GP. The general affairs section GP has, in the hard disk, two personal boxes numbered 00 and 01, each of which separately stores the PDL data from the host apparatus in the form of raster image developed through the electronic sorter.

Each personal box has its own name, although not really labeled on the actual screen, on the screen on the control panel 500. For instance, the box number 00 is tagged with "Box for Kato", indicating that box is used by Kato.

A percentage indicator on the rightmost of the line of each box indicates the percentage of memory used by that personal box to the memory capacity of the entire personal box area in the hard disk. For instance, the box number 00 uses 5% or about 35 MB, of the personal box area memory capacity of 700 MB in the hard disk.

A button 902 is used to monitor a job stored in the box number 00. Similarly, a button 803 is used to monitor a job stored in the box number 01. As shown in FIG. 10 and FIG. 11, Kato transfers application document data to his or her own box 00 on the general affairs section GP from a host computer, and attempts to print out from the control panel 500 on the general affairs section GP. If the copying apparatus is used by someone else, Kato presses the other device key 805 on the personal box main screen 801 on the control panel 500 in the sales section 1 GP, which is another copying apparatus. As shown in FIG. 15, Kato then selects the general affairs section GP and presses the OK key 952, and then presses the button 902 for his or her own box number 00 on the screen shown in FIG. 16. The printing now starts.

Scroll key 906 or 907 is pressed to scroll through the information on the screen. A close key 908 is pressed to return to the personal box main screen 801 shown in FIG. 12. A fax status key 909 is pressed to monitor facsimile transmission and reception status.

After selecting the box, the same operational flow described with reference to FIG. 12, FIG. 13, and FIG. 14 is performed. Specifically, a desired box is selected from among the plurality of boxes (see FIG. 12), a password for the selected box is entered (see FIG. 13), a desired print job is selected on the screen (see FIG. 14) which appears in response to the input of the valid password, the operation mode including the detailed setting of the job is modified as necessary, and a print command is entered. A series of these steps remains unchanged regardless of whether the user prints out a desired job from a personal box in own apparatus or a personal box in another apparatus. No particularly complex operation is required, and the ease of use is thus assured in a user-friendly environment. At the timing of the pressing the print key 817 on the control panel 500 of the sales section 1 GP, the user retrieves, from the personal box of the general affairs section GP, the developed PDL data the host computer transferred to the personal box in the general affairs section GP, and prints out the developed PDL data on the printer of the sales section 1 GP.

Figure 17:
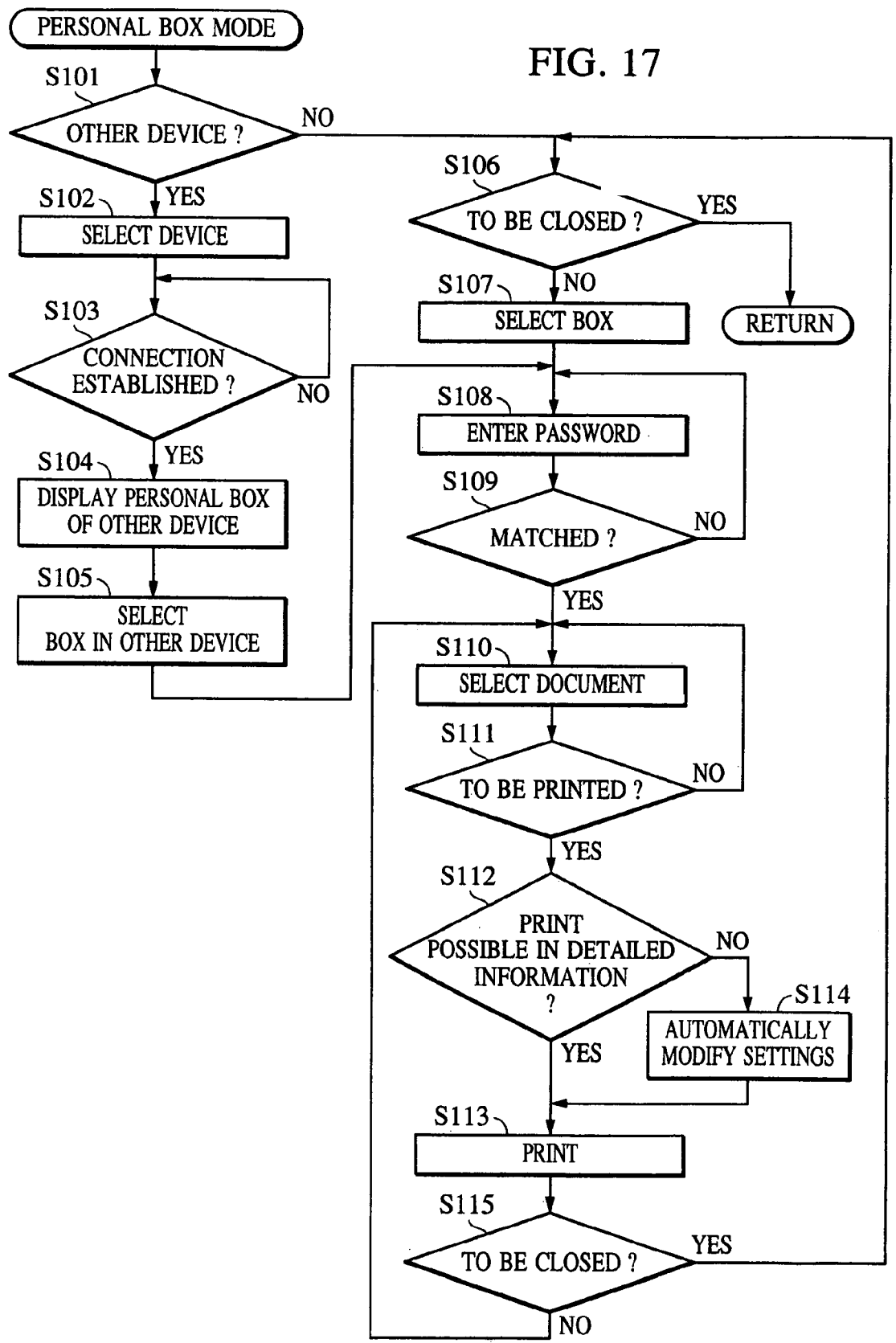
FIG. 17 is a flow diagram showing the operation of a first embodiment.
Figure 19:
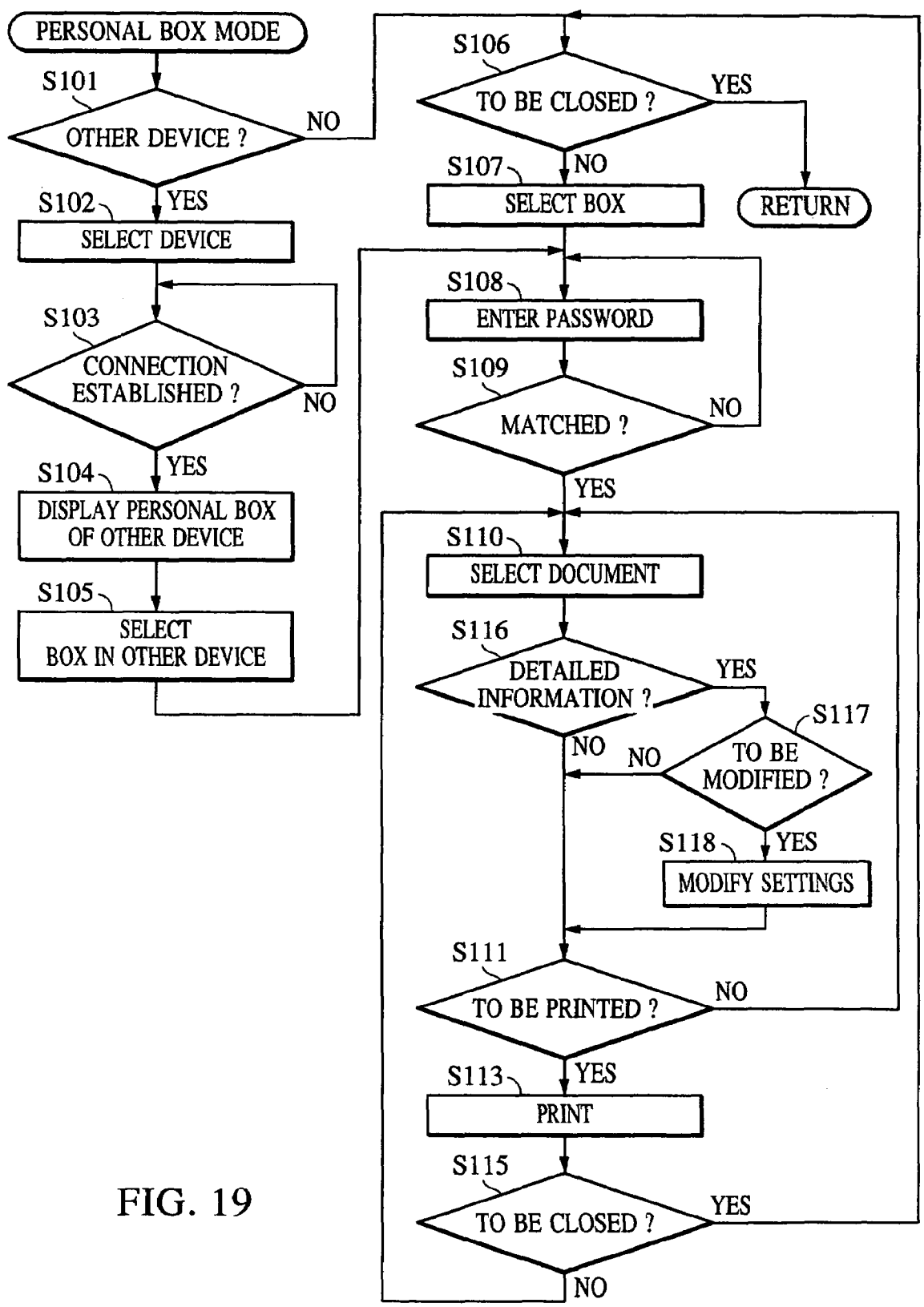
FIG. 19 is a flow diagram showing the operation of the second embodiment.

The monitoring and retrieval operation of data from the personal box in the other apparatus in accordance with the first embodiment is discussed, referring to a flow diagram shown in FIG. 17. Control processes illustrated in this flow diagram and another flow diagram in FIG. 19 are executed by the CPU 323 in the core section 10 in accordance with programs beforehand stored in the memory 324.

The user transfers PDL data with both-side printing set in the operation mode from the host computer to an image-forming apparatus having a both-side printing unit of the general affairs section GP, and later attempts to print out the print data on the image-forming apparatus of the general affairs section GP. However, the image-forming apparatus now happens to be used by someone else in the general affairs section GP. The user looks into the personal box of the general affairs section GP through the network, using the image-forming apparatus of the sales section 1 GP, which is different from the image-forming apparatus of the general affairs section GP. The user retrieves the developed PDL image data (stored in the personal box of the general affairs section GP in the image-processing apparatus) into the image-forming apparatus of the sales section 1 GP through the network, and prints out the developed PDL image data on the image-forming apparatus of the sales section 1 GP. This series of steps is now discussed using the flow diagram.

It is determined in step S101 whether the user has pressed the other device key 805 on the screen shown in FIG. 12 and provided on the control panel 500 of the image-forming apparatus of the sales section 1 GP. When it is determined that the other device key 805 remains unpressed, the process goes to step S106. When it is determined that the user has pressed the other device key 805, the process goes to step S102. It is determined whether there are available other remote image-forming apparatuses which can exchange data with the user's own apparatus (here the image-forming apparatus of the sales section 1 GP), and switches the control panel 500 from the screen shown in FIG. 12 to the screen shown in FIG. 15 to show the determination result on screen. When the user selects the general affairs section GP as a desired apparatus and presses the OK key 952 as shown in FIG. 15, the process goes to step S103. Step S103 is looped until the connection to that GP is established. The communication is performed between the respective network interfaces 7 of the two image-forming apparatuses through the TCP/IP protocol, for instance.

When the connection is established, the process goes to step S104. In step S104, the information in the personal box in the other image-forming apparatus the user has selected on the screen shown in FIG. 15 in step S102, namely, the content in the personal box in the image-forming apparatus of the general affairs section GP is displayed as shown in FIG. 16 (with the control panel 500 switching from the screen shown in FIG. 15 to the screen shown in FIG. 16).

Prior to the execution of the step S104, the image-forming apparatus of the sales section 1 GP is selected in step S102, and a request-to-send command is transmitted to image-forming apparatus of the general affairs section GP to acquire the data in the personal box of the general affairs section GP in the hard disk in the image-forming apparatus of the general affairs section GP with which the connection is established. In this case, for instance, the data includes the information required to display the screen shown in FIG. 16, for instance, name data of the boxes owned by the image-forming apparatus, and the quantity of data each personal box contains, the information required to display the screen shown in FIG. 14, for instance, of the document of each box, and the information required to display the screen shown in FIG. 18, as will be discussed later, for instance, of detailed operation mode set for each document. Upon receiving the command, the image-forming apparatus of the general affairs section GP reads the data in the personal box of the general affairs section GP in the hard disk 257 and sends the data through its own control unit 252, interface 213, interface 322, data processing unit 321, interface 320, and network interface 7, to the image-forming apparatus of the sales section 1 GP through the network. The image-forming apparatus of the sales section 1 GP receives, through the network, the data about the personal box in the hard disk 257 in the image-forming apparatus of the general affairs section GP and then transfers the data to its own network interface 7, interface 320, data processing unit 321, interface 322, interface 213, image processor 211, CPU 214, and control panel 500. Subsequent to the reception of the series of data, the screen shown in FIG. 16 is presented on the control panel 500 of the image-forming apparatus of the sales section 1 GP in step S104.

In step S105, the user selects a desired box on the screen shown in FIG. 16 from among the personal boxes owned by the other image-forming apparatus able to exchange data and selected in step S102. When the user presses the close key 908 on the screen shown in FIG. 16, the personal box mode is closed.

When the process goes to step S106 without pressing the other device key 805 in step S101, the image-forming apparatus of general affairs section GP determines whether the user has pressed the close key 808 on the screen shown in FIG. 12. When it is determined that the user has pressed the close key 808, the personal box mode is closed. When it is determined the close key 808 remains unpressed, the user selects a desired personal box on the screen shown in FIG. 12 from among the personal boxes of own apparatus in step S107. When the user presses the button 803 on the screen shown in FIG. 12, designating the box for Tanaka, for instance, a password input screen is presented as shown in FIG. 13 in step S108. The password for Tanaka (the password for the selected personal box) is requested. In step S109, the password input in step S108 is checked against the password stored in the memory for the personal box the user selected, for matching. When the two passwords fail to match each other, step S108 is repeated. When the two passwords match each other, the process goes to step S110.

The password input screen also appears in step S108 as shown in FIG. 13, and the password for the user (the password for the selected box) is requested, when the image-forming apparatus of the sales section 1 is used, in other words, when the process proceeds to step S105 through steps S102, S103, and S104, subsequent to the pressing of the other device key 805 by the user in step S101. The user designates a desired personal box (the box for Sato, for instance) from among the personal boxes of the other image-forming apparatus (here the general affairs section GP) able to exchange data and selected in step 102, using the screen shown in FIG. 16 on own apparatus (here the sales section 1 GP). In step S109, the password input in step S108 is checked against the password for the box the user previously selected. The password is the one for the personal box in the other image-forming apparatus. The password information may be beforehand registered and managed in the memory of own apparatus as discussed above. In an alternative method, the personal box information of the other image-forming apparatus selected in step S102 is acquired through the network to display on the control panel 500 of own apparatus in step S104, and the password information for the personal boxes owned by the other image-forming apparatus may be acquired together as one piece of the personal box information. When the two passwords fail to match each other, step S108 is repeated, else the process continues at step S110.

When the password input on the screen shown in FIG. 13 is valid, the information about the content of, i.e., of what file (document) is contained in, the personal box is listed in a table on the control panel 500 as shown in FIG. 14 to prompt the user to select a desired document in step S110. For instance, when the box for Tanaka, as shown in FIG. 12, is selected, the screen shown in FIG. 14 is presented for document selection. Also, a desired box (the box for Sato, for instance) may be selected from among the personal boxes in the other image-forming apparatuses using the screen shown in FIG. 16, and then a valid password corresponding to the box may be entered on the screen shown in FIG. 13. In this case, as well, the information of the content of, i.e., of what file (document) is stored in, a box the user has selected from among the personal boxes of the other image-forming apparatus is processed in step S104, and the user is thus allowed to select a desired document on the table on the control panel 500 shown in FIG. 14, based on the data about the personal boxes of the other image-forming apparatus, acquired through the network from the other image-forming apparatus. In summary, the display content on the screen shown in FIG. 14 is presented on the control panel 500 regardless of whether a box is selected on the screen shown in FIG. 12 or on the screen shown in FIG. 16.

When the user selects "B materials for conference" on the screen shown in FIG. 14, and it is determined in step S111 that the print key 817 is pressed, the process continues at step S112. It is determined whether the printing of the document selected in step S110 is possible in the operation mode preset in the host computer. If it is determined that the printing of the document is possible, the process goes to step S113. Now, the host computer sends the image data to the personal box in the image-forming apparatus of the general affairs section GP in an attempt to set a printing mode available in the general affairs section GP, the both-side printing mode, for instance, and stores, in the personal box, the image data associated with the both-side printing mode. However, because the image data cannot be printed out on the general affairs section GP, the user looks into the personal box of the general affairs section GP using the image-forming apparatus of the sales section 1 GP, then retrieves the image data therefrom through the network, and prints out the image data on the image-forming apparatus of the sales section 1 GP (this series of steps correspond to steps S101 through S105, and steps S110 and S111). If the image-forming apparatus of the sales section 1 GP has no both-side printing unit (with no both-side printing capability) or with the both-side printing unit in trouble, the user's own apparatus thus determines that the document selected in step S110 cannot be printed out in accordance with the operation mode set in the host computer. In this case, the answer to the determination in step S112 becomes negative, and the process goes to step S114. The user's own apparatus (the sales section 1) thus automatically modifies settings to the operation mode that can be carried out on own apparatus. In this case, the operation mode predetermined in the host computer for the document selected in step S110 may be modified from "both-side printing" to "one-side printing". The process continues at step S113.

In step S113, the user's own apparatus reads the image data of B materials for conference stored in the personal box in the hard disk 257, acquires the image data through the control unit 252, smoothing unit 253, and γ corrector 254, and prints out the image data on the printer section 2 in accordance with the operation mode set (with the operation mode automatically modified in step S114 if the process takes step S114).

It is determined in step S115 whether the close key 821 has been pressed. When it is determined that the close key 821 remains unpressed, the process loops back to step S110 to repeat document selection. When it is determined the close key 821 has been pressed, the process jumps back to step S106 to return to the box selection screen shown in FIG. 12.

In step S113, the user looks into the personal box of the general affairs section GP from the control panel 500 of the sales section 1 GP for printing operation (corresponding to the process from step S101 through step S105, and steps S110 and S111). The image-forming apparatus of the sales section 1 GP reads desired image data from the personal box of the general affairs section GP in the hard disk of the image-forming apparatus of the general affairs section GP and receive the image data through the control unit 252, the interface 213, the interface 322, the data processing unit 321, the interface 320, and the network interface 7 in the image-forming apparatus of the general affairs section GP and then through the network. The image-forming apparatus of the sales section 1 GP thus receives the image data from the image-forming apparatus of the general affairs section GP through its own network interface 7, the interface 320, the data processing unit 321, the interface 322, the interface 213, the image processor 211, and the printer section 2, thereby printing out the image data on the printer section 2 in accordance with the operation mode automatically modified in step S114 (with the operation mode unmodified if the answer to the determination in step S112 is affirmative). To print the image data received from the external apparatus on the user's own apparatus, the hard disk 257 of the user's own apparatus stores the image data along together with the operation mode (in the temporary area 600, for instance).

When the printing operation has normally ended in the sales section 1 GP, the CPU 214 in the sales section 1 GP detects the end of the printing operation. The image-forming apparatus of the sales section 1 GP communicates with the network interface 7 of the general affairs section GP through its own image processor 211, the interface 213, interface 322, the CPU 323, the interface 320, and the network interface 7, thereby notifying the general affairs section GP as the source of the image data that the printing operation has normally ended. Through the interface 320, the CPU 323, the interface 322, the interface 213, the image processor 211, and the control unit 252, the image-forming apparatus of the sales section 1 GP instructs the image memory 255 thereof to delete, from the memory of the sales section 1 GP, the original document image data that has already been printed. Through the SCSI controller 256, the image-forming apparatus of the sales section 1 GP deletes the original document image data (from the general affairs section GP) already printed in step S113, together with the operation mode data corresponding thereto, from the hard disk 257 in the sales section 1 GP. In this way, leaks of the data is thus prevented, assuring the security of the data, when the image data stored in the personal box in one image-forming apparatus is retrieved and is printed on another image-forming apparatus.

The image data, from the general affairs section 1 GP, printed at the sales section 1 GP, is deleted from the sales section 1 GP's own memory, but the image data is held in the personal box of the general affairs section GP.

Alternatively, in response to the end of the printing in the sales section 1 GP, the image data, already printed in the sales section 1 GP, may also be deleted from the personal box in the general affairs section 1 GP.

Remote control may be performed to the personal box in the other image-forming apparatus with which the user's own apparatus exchanges data, using the control panel 500 of the user's own apparatus. As described above, the document selected in step S110, stored in the personal box in the other image-forming apparatus selected in step S102, is printed on own apparatus using the print key 817 on the screen shown in FIG. 14. Besides such an operation, the following operations are also possible. In one operation, using the delete key 818 on the screen shown in FIG. 14, the user's own apparatus sends a delete command to the other image-forming apparatus through the network, thereby deleting the image data selected on the screen shown in FIG. 14 from the personal box in the other image-forming apparatus. In another operation, the user's own apparatus sends, to the other image-forming apparatus through the network, a modification command which is entered on a screen (see FIG. 18 to be discussed later) which is called by pressing the detailed information key 816 on the screen shown in FIG. 14. The data stored in the memory of the other image-forming apparatus is rewritten to modify the operation mode of the document stored in the personal box in the other image-forming apparatus. In any case, without entering the valid password in the password input screen shown in FIG. 13, the image shown in FIG. 14 will not appear. In the operations in which the user's own apparatus deletes or modifies the data in the personal box in the other image-forming apparatus, the system prevents a third party from gaining unauthorized access to the data.

Second Embodiment

A second embodiment of the present invention is now discussed. Since the basic construction of the second embodiment remains unchanged from that of the first embodiment shown in FIG. 1 through FIG. 16, the discussion thereabout is not repeated here. In the second embodiment, an image-forming apparatus of a "general affairs section GP" is not equipped with a both-side printing unit, while an image-forming apparatus of a "sales section 1 GP" includes a both-side printing unit.

Figure 18:
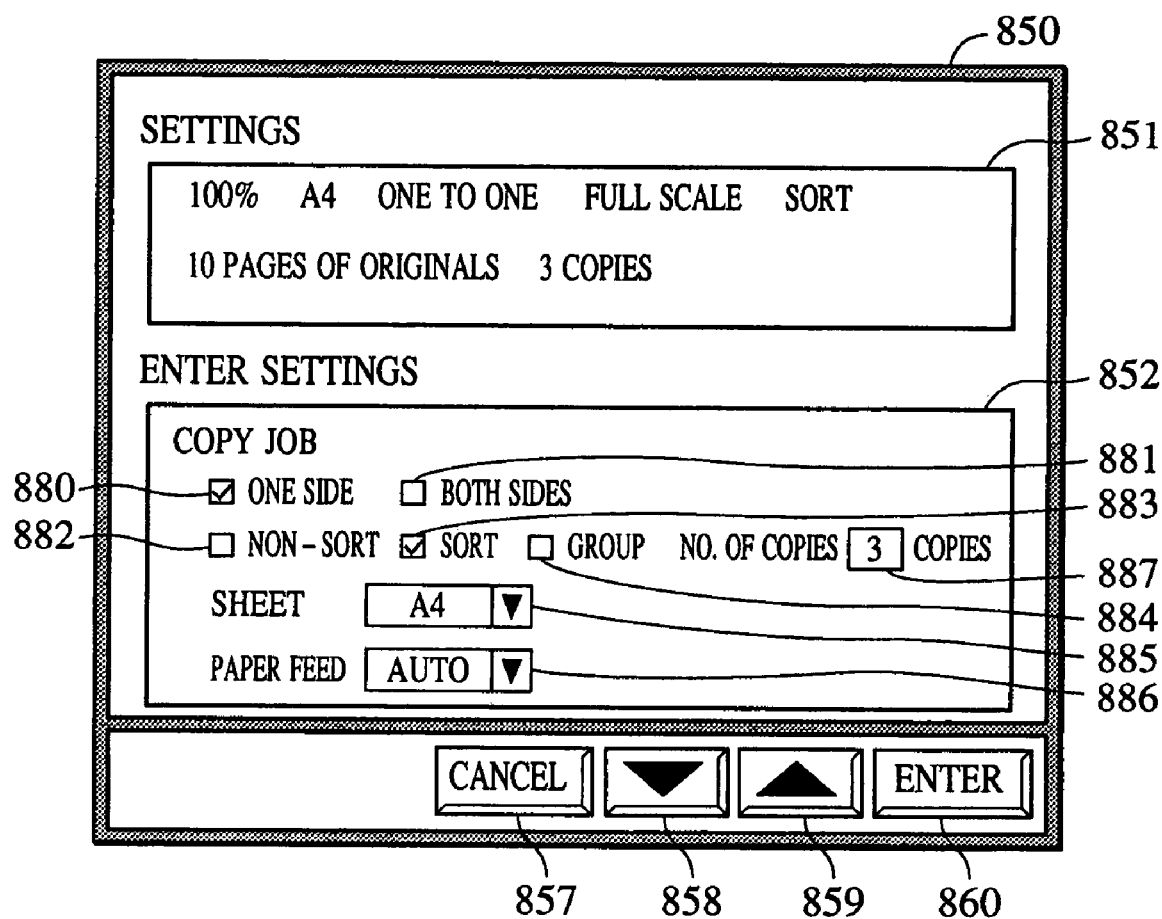
FIG. 18 shows a screen of a control panel of a second embodiment.

FIG. 18 shows a screen of the control panel 500 with the detailed information key 816 pressed on the screen shown in FIG. 14.

Now, the user sets one-side printing on the one-side printing setting window 723 of the host computer shown in FIG. 11, and sends the PDL data to the personal box of the general affairs section GP having no both-side printing unit.

Since the general affairs section GP is used by someone else, and cannot be now available, the printing operation needs to be performed on the sales section 1 GP having a both-side printing unit.

A detailed information screen 850 displays detailed information of the job stored in the personal box selected in FIG. 14. A setting information display screen 851 displays detailed information of settings that are beforehand set on the application print screen on the host computer, for instance displaying a message stating "Copying to A4 sized sheets, three copies per original, in a one-side printing fashion". These pieces of information are the ones which have been received together with the PDL document data to be stored into the personal box. The information on the setting information display screen 851 here indicates that ten pages of originals are copied to A4 sized sheets at full-scale, in a one-side printing fashion, with three copies per original with a sorting function used.

A setting modification screen 852 includes a one-side check window 880 and a both-side check window 881 which are respectively checked for one-side printing and both-side printing. Since the setting preset in the host computer is the one-side printing, the one-side check window 880 is checked. If the sales section 1 GP, on which the printing is to be performed, is equipped with the both-side printing unit, the both-side check window 881 may be pressed for checking the square mark. The printing operation is thus performed in a both-side printing mode.

Non-sort, sort, and group check windows 882, 883, and 884 are pressed for the respective settings. Referring to FIG. 19, the setting preset in the host computer is the sort setting, and the sort check window 883 is checked.

A paper selection key 885 indicates that the sheet size preset in the host computer is the A4 sheet size. Press a right-hand side downward looking arrow, and a menu for other sheet sizes is opened to allow the user to select other sheet size. A sheet feeder selection key 886 now indicates that the sheet feeder preset in the host computer is auto. Press a right-hand side downward looking arrow, and a menu for sheet feeder stack is opened, to allow the user to select a sheet feeder. A number-of-copies key 887 now indicates that the number of copies preset in the host computer is three. Press this key, and the number of copies will be changed to a desired number using the numeric keys.

When own apparatus is provided with additional functions such as a stapling function, although not shown, settings for such functions may be input in the print job.

A cancel key 857 is pressed to cancel a modification introduced on the setting modification screen 852. A downward scroll key 858 is used to downward scroll through the information on the screen when the information is too large to be displayed on the setting modification screen 852.

An upward scroll key 860 is used to upward scroll through the information on the screen. An enter key 860 is pressed to validate the modification set in the print job. Upon pressing, the screen shown in FIG. 14 appears.

By pressing the print key 817 on the screen shown in FIG. 14, the print job is carried out in accordance with the settings (in the operation mode) introduced on the screen shown in FIG. 18.

The operation of data monitoring and retrieval of the personal box of the other image-forming apparatus in accordance with the second embodiment is now discussed, referring to FIG. 19. As shown, steps identical to those described with reference to FIG. 17 are designed with the same step numbers.

In the process shown in FIG. 19, the user transfers the PDL data in a one-side printing mode from the host computer to the personal box of the general affairs section GP having no both-side printing unit. The general affairs section GP happens to be currently used by someone else, and the user monitors the personal box in the general affairs section GP from the sales section 1 GP through the network, retrieves the developed PDL image data stored therein, and prints out the image data in a both-side printing mode on the sales section 1 GP having a both-side printing unit.

It is determined in step S101 whether the user has pressed the other device key 805 on the screen provided on the control panel 500 of the image-forming apparatus of the sales section 1 GP and shown in FIG. 12. When it is determined that the other device key 805 remains unpressed, the process goes to step S106. When it is determined that the user has pressed the other device key 805, the process goes to step S102. It is then determined whether there are available other remote image-forming apparatuses which exchange data with own apparatus (here the image-forming apparatus of the sales section 1 GP), and switches the control panel 500 from the screen shown in FIG. 12 to the screen shown in FIG. 15 to show the determination result on screen. When the user selects the general affairs section GP as a desired apparatus and presses the OK key 952 as shown in FIG. 15, the process goes to step S103. Step S103 is looped until the connection to that GP is established. The communication is performed between the respective network interfaces 7 of the two image-forming apparatuses through the TCP/IP protocol, for instance.

When the connection is established, the process goes to step S104. In step S104, the information in the personal box in the other image-forming apparatus the user has selected on the screen shown in FIG. 15 in step S102, namely, the content in the personal box in the image-forming apparatus of the general affairs section GP is displayed as shown in FIG. 16 (the control panel 500 switches from the screen shown in FIG. 15 to the screen shown in FIG. 16).

Prior to the execution of the step S104, the image-forming apparatus of the sales section 1 GP is selected in step S102, and a request-to-send command is transmitted to image-forming apparatus of the general affairs section GP to acquire the data in the personal box of the general affairs section GP in the hard disk in the image-forming apparatus of the general affairs section GP with which the connection is established. In this case, for instance, the data includes the information required to display the screen shown in FIG. 16, for instance, name data of the boxes owned by the image-forming apparatus, and the quantity of data each personal box contains, the information required to display the screen shown in FIG. 14, for instance, of the document of each box, and the information required to display the screen shown in FIG. 18, for instance, of detailed operation mode set for each document. Upon receiving the command, the image-forming apparatus of the general affairs section GP reads the data in the personal box of the general affairs section GP in the hard disk 257 and sends the data through its own control unit 252, the interface 213, the interface 322, the data processing unit 321, the interface 320, and the network interface 7, to the image-forming apparatus of the sales section 1 GP through the network. The image-forming apparatus of the sales section 1 GP receives, through the network, the data about the personal box in the hard disk 257 in the image-forming apparatus of the general affairs section GP and then transfers the data to its own network interface 7, the interface 320, the data processing unit 321, the interface 322, the interface 213, the image processor 211, the CPU 214, and the control panel 500. Subsequent to the reception of series of data, the screen shown in FIG. 16 is presented on the control panel 500 of the image-forming apparatus of the sales section 1 GP in step S104.

In step S105, the user selects a desired box on the screen shown in FIG. 16 from among the personal boxes owned by the other image-forming apparatus selected in step S102 and able to exchange data. When the user presses the close key 908 on the screen shown in FIG. 16, the personal box mode is closed.

When the process goes to step S106 without pressing the other device key 805 in step S101, the image-forming apparatus of general affairs section GP determines whether the user has pressed the close key 808 on the screen shown in FIG. 12. When it is determined that the user has pressed the close key 808, the personal box mode is closed. When it is determined the close key 808 remains unpressed, the user selects a desired personal box on the screen shown in FIG. 12 from among the personal boxes of own apparatus in step S107. When the user presses the button 803 on the screen shown in FIG. 12, designating the box for Tanaka, for instance, a password input screen is presented as shown in FIG. 13 in step S108. The password for Tanaka (the password for the selected personal box) is requested. In step S109, the password input in step S108 is checked against the password stored in the memory for the personal box the user selected, for matching. When the two passwords fail to match each other, step S108 is repeated. When the two passwords match each other, the process goes to step S110.

The password input screen also appears in step S108 as shown in FIG. 13, and the password for the user (the password for the selected box) is requested, when the image-forming apparatus is used, in other words, when the process proceeds to step S105 through steps S102, S103, and S104, subsequent to the pressing of the other device key 805 by the user in step S101. The user designates a desired personal box (the box for Sato, for instance) from among the personal boxes of the other image-forming apparatus (here the general affairs section GP) able to exchange data and selected in step 102, using the screen shown in FIG. 16 on the user's own apparatus (here the sales section 1 GP). In step S109, the password input in step S108 is checked against the password for the box the user previously selected. The password is the one for the personal box in the other image-forming apparatus. The password information may be beforehand registered and managed in the memory of own apparatus as discussed above. In an alternative method, the personal box information of the other image-forming apparatus selected in step S102 is acquired through the network to display on the control panel 500 of own apparatus in step S104, and the password information for the personal boxes owned by the other image-forming apparatus may be acquired together as one piece of the personal box information. When the two passwords fail to match each other, step S108 is repeated, else the process continues at step S110.

When the password input on the screen shown in FIG. 13 is valid, the information about the content of, i.e., of what file (document) is contained in, the personal box is listed in a table on the control panel 500 as shown in FIG. 14 to prompt the user to select a desired document in step s110. For instance, when the box for Tanaka, as shown in FIG. 12, is selected, the screen shown in FIG. 14 is presented for document selection. Also, a desired box (the box for Sato, for instance) may be selected from among the personal boxes in the other image-forming apparatuses using the screen shown in FIG. 16, and then a valid password corresponding to the box may be entered on the screen shown in FIG. 13. In this case, as well, the information of the content of, i.e., of what file (document) is stored in, a box the user has selected from among the personal boxes of the other image-forming apparatus is processed in step S104, and the user is thus allowed to select a desired document on the table on the control panel 500 shown in FIG. 14, based on the data about the personal boxes of the other image-forming apparatus, acquired through the network from the other image-forming apparatus. In summary, the display content on the screen shown in FIG. 14 is presented on the control panel 500 regardless of whether a box is selected on the screen shown in FIG. 12 or on the screen shown in FIG. 16.

It is determined in step S116 whether the detailed information key 816 shown in FIG. 14 has been pressed. When it is determined that the detailed information key 816 remains unpressed, the process jumps to step S111. When it is determined that the detailed information key 816 has been pressed, the process goes to step S117. The control panel 500 presents the setting modification screen shown in FIG. 18 where the operation mode preset for the document selected in step S110 in the host computer is verified or modified. On the screen shown in FIG. 18, the user can thus modify the print mode preset in the host computer, for instance, the settings "full scale (100%), sheet size A4, one-side printing, sorting, and three copies per original" (an additional setting is also possible in the operation mode). As described with reference to FIG. 18, the user modifies the operation mode in step S117, and presses the enter key 860 shown FIG. 18, the process goes to step S118. The screen shown in FIG. 14 on the control panel 500 is called, and the settings (in the operation mode) for the document selected in step S110 is modified (updated) to the settings (in the operation mode) introduced by the user in step S117.

When the user looks into the personal box of the general affairs section GP from the sales section 1 GP in step S104, the user modifies the operation mode of the document selected in step S110 (rewrites the operation mode data stored in the memory of the sales section 1 GP), out of the operation mode information of the personal box of the general affairs section GP, contained in the data about the personal box of the general affairs section GP acquired from the general affairs section GP through the network. The process then goes to step S111.

When it is determined in step S111 that the user has pressed the print key 817 on the screen shown in FIG. 14, the document selected by the user in step S110 and stored in the personal box in the hard disk 257, for instance, the image data of B materials for conference, is read, and is printed out on the printer section 2 through the control unit 252, smoothing unit 253, and γ corrector 254. If the setting of the print job is modified, from the one-side printing mode to the both-side printing mode, for instance, the print job is accordingly performed.

It is determined in step S115 whether the close key 821 is pressed. When it is determined that the close key 821 remains unpressed, the process loops back to step S110 to repeat document selection. When it is determined the close key 821 is pressed, the process jumps back to step S106 to return to the box selection screen shown in FIG. 12.

In step S113, the user looks into the personal box of the general affairs section GP from the control panel 500 of the sales section 1 GP for a printing operation on the sales section 1 GP. The image-forming apparatus of the sales section 1 GP reads the image data selected in step S110 from the hard disk 257 that stores the image data (document) of the personal boxes of the general affairs section GP. The image-forming apparatus of the sales section 1 GP thus retrieves desired image data through the control unit 252, interface 213, interface 322, data processing unit 321, interface 320, network interface 7 in the image-forming apparatus of the general affairs section GP, and through the network, and then through the network interface 7, interface 320, data processing unit 321, interface 322, interface 213, image processor 211, and printer section 2 in the image-forming apparatus of the sales section 1 GP. Own apparatus thus once stores the image data in association with the corresponding operation mode data in the hard disk 257, and prints out the image data in accordance with the modification introduced on the screen shown in FIG. 18 in step S118.

When the printing operation has normally ended in the sales section 1 GP, the CPU 214 in the sales section 1 GP detects the end of the printing operation. The image-forming apparatus of the sales section 1 GP communicates with the network interface 7 of the general affairs section GP through its own image processor 211, the interface 213, the interface 322, the CPU 323, the interface 320, and the network interface 7, thereby notifying the general affairs section GP as the source of the image data that the printing operation has normally ended. Through the interface 320, the CPU 323, the interface 322, the interface 213, the image processor 211, and the control unit 252, the image-forming apparatus of the sales section 1 GP instructs the image memory 255 thereof to delete, from the memory of the sales section 1 GP, the original document image data that has already been printed. Through the SCSI controller 256, the image-forming apparatus of the sales section 1 GP deletes the original document image data (from the general affairs section GP) already printed in step S113, together with the operation mode data corresponding thereto, from the hard disk 257 in the sales section 1 GP. In this way, leaks of the data is prevented, assuring the security of the data, when the image data stored in the personal box in one image-forming apparatus is retrieved and is printed on another image-forming apparatus.

A storage medium storing software program codes for performing the functions of the first and second embodiments (in particular, the flow diagrams illustrated in FIG. 17 and FIG. 19, and program codes for display control and process for presenting the screens shown in FIG. 12 through FIG. 16 and FIG. 18) is supplied to a system or an apparatus. The computer (CPU or MPU) of the system or apparatus reads the program codes stored in the storage medium to execute the program. The objects of the present invention are thus achieved.

The program codes read from the storage medium perform the functions of the above-referenced embodiments, and the storage medium storing the program code constitutes the present invention.

Available as storage media for feeding the program code are floppy disk, hard disk, optical disk, magnetooptical disk, CD-ROM, CD-R, magnetic tape, non-volatile memory card, ROM, and the like.

By executing the program code read by the computer, the functions of the embodiments are performed. Furthermore, the OS (Operating System) running on the computer performs partly or entirely an actual process according to the instruction of the program code, and the functions of the embodiments are thus performed.

The program codes read from the storage medium are written on a function expansion board inserted into the computer or a memory provided on an function expansion unit connected to the computer. A CPU on the expansion board or function expansion unit partly or entirely performs the process. The functions of the embodiments are thus performed. Such a system also falls within the scope of the present invention.

The above-referenced embodiments employ an electrophotographic method using a laser beam on the printing mechanism thereof. However, the present invention is not limited to the electrophotographic method. Other printing methods, such as LED printer, thermal transfer printer, ink-jet printer, may be employed.

As described above, in each of the above-referenced embodiments, the user transfers the PDL print job to the personal box of a digital copying apparatus and prints out the developed PDL original document image stored in the personal box on the control panel of the digital copying apparatus. Even when the digital copying apparatus happens to be used by someone else, the user retrieves the original document image data in the personal box from the digital copying apparatus currently in use through another digital copying apparatus which is able to communicate with the first digital apparatus, and prints out the original document image on thereon. When the digital copying apparatus the user accesses for printing runs out of toner, copy sheets, or with the printer thereof in trouble, the user retrieves the original document image data for printing from the personal box in the digital copying apparatus currently in trouble, through another digital copying apparatus which is able to communicate with the first digital copying apparatus.

With this arrangement, the user does not need to wait for until someone else finishes the job on the digital copying apparatus or until the digital copying apparatus is restored for normal operation. The availability of the apparatus is thus increased.

The PDL job in the both-side printing mode input to the personal box is retrieved from the personal box for printing in the other digital copying apparatus. When the other digital copying apparatus has no both-side printing unit or in trouble, the printing mode is automatically switched to the one-side printing mode. This arrangement assures the ease of use, eliminating the need for complex operation responsive to the status of the digital copying apparatus performing the printing operation.

After the original document image data is retrieved from the other digital copying apparatus and is printed, the original document image data in the personal box in the other digital copying apparatus is automatically deleted. This arrangement frees the user from waiting until someone else finishes the job on the digital copying apparatus. The availability of the digital copying apparatus is increased, and the ease of use is assured.

Now, the PDL job input to the personal box by the user is in the one-side printing mode, and one digital copying apparatus has no both-side printing unit. When the original document image data is retrieved from the personal box in the other digital copying apparatus for printing on the other digital copying apparatus, the printing mode is switched to the both-side printing mode when the other digital copying apparatus has a both-side printing unit. The functions of the apparatuses are sufficiently utilized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image-forming system comprising:
   a plurality of image-forming apparatuses with printing units, each image-forming apparatus comprising (a) a network communication unit and (b) a storage unit adapted to store image data and operation mode data received through the network communication unit;
   a data acquisition unit through which a first image-forming apparatus of said plurality of image-forming apparatuses acquires, through the network communication unit, the image data and the operation mode data stored in another image-forming apparatus of said plurality of image-forming apparatuses, according to a request from a user of said first image-forming apparatus, the request being made by the user of said first image-forming apparatus via a user interface that displays to the user information about the image data stored in said another image-forming apparatus, the information being obtained from said another image-forming apparatus in response to use by the user of the user interface; and
   an operation mode update unit adapted to automatically update the operation mode of the first image-forming apparatus to an operation mode in accordance with the acquired operation mode data.

2. An image-forming system according to claim 1, wherein the operation mode update unit updates the operation mode, and the acquired image data and the operation mode data are erased after the acquired image data is printed out.

3. An image-forming system comprising:
   a plurality of image-forming apparatuses with printing units, each image-forming apparatus comprising (a) a network communication unit and (b) a storage unit adapted to store image data and operation mode data received through the network communication unit;
   a data acquisition unit through which a first image-forming apparatus of said plurality of image-forming apparatuses acquires, through the network communication unit, the image data and the operation mode data stored in another image-forming apparatus of said plurality of image-forming apparatuses, according to a request from a user of said first image-forming apparatus, the request being made by the user of said first image-forming apparatus via a user interface that displays to the user information about the image data stored in said another image-forming apparatus, the information being obtained from said another image-forming apparatus in response to use by the user of the user interface; and
   an operation mode update unit adapted to update the operation mode of the first image-forming apparatus to an operation mode in accordance with the acquired operation mode data in response to a command by the user of said first image-forming apparatus from a control panel of the first image-forming apparatus.

4. An image-forming system according to claim 3, wherein the operation mode update unit updates the operation mode, and the acquired image data and the operation mode data are erased after the acquired image data is printed out.

5. An image-forming apparatus that communicates data, via a data communication medium, with a remote image-forming apparatus storing image data for printing, said image-forming apparatus comprising:

- means for displaying, to a user of said image-forming apparatus, information about the image data stored in the remote image-forming apparatus, the information being obtained from the remote image-forming apparatus in response to use by the user of said image-forming apparatus of a user interface, and for prompting the user of said image-forming apparatus to select image data stored in the remote image-forming apparatus for printing by said image-forming apparatus;
- a transmitter adapted to transmit, to the remote image-forming apparatus via the data communication medium, a first data request requesting that the remote image-forming apparatus transmit, to the image-forming apparatus, image data stored in the remote image-forming apparatus, in accordance with the selection made by the user of said image forming apparatus; and
- an acquisition unit adapted to acquire, via the data communication medium, data output by the remote image-forming apparatus in response to the data request, the data including operation mode data preset for the image data stored in the remote image-forming apparatus.

6. An image-forming apparatus according to claim 5, further comprising a display controller adapted to display, on a display unit, the operation mode data transmitted from the remote image-forming apparatus and acquired through the acquisition unit.

7. An image-forming apparatus according to claim 5, wherein the acquisition unit acquires, via the data communication medium, the series of image data from the remote image-forming apparatus, according to the operation mode.

8. An image-forming apparatus according to claim 7, further comprising a printing unit adapted to print the series of image data, acquired from the remote image-forming apparatus by the acquisition unit, in accordance with the operation mode data acquired from the remote image-forming apparatus in association with the series of image data.

9. An image-forming apparatus according to claim 8, wherein the printing unit prints out, through a storage unit adapted to store the image data, the series of image data from the remote image-forming apparatus.

10. An image-forming apparatus according to claim 9, further comprising an erase controller adapted to perform an erase process on a series of already printed image data stored in the storage unit, in response to an end of the printing of the series of image data by the printing unit.

11. An image-forming apparatus according to claim 8, further comprising a code input unit adapted to input codes, and a print controller adapted to determine whether to execute printing of the series of image data through the printing unit, based on a code input through the code input unit.

12. An image-forming apparatus according to claim 8, further comprising:

- a determination unit adapted to determine whether a process in accordance with the operation mode data acquired from the remote image-forming apparatus through the acquisition unit is executable; and
- an update control unit adapted to automatically update the operation mode data acquired from the remote image-forming apparatus through the acquisition unit, in response to a determination result provided by the determination unit, and to perform a print process in accordance with the updated operation mode.

13. An image-forming apparatus according to claim 8, further comprising an update controller adapted to update the operation mode data acquired from the remote image-forming apparatus through the acquisition unit, in response to an instruction from a user, and to perform a print process in accordance with the updated operation mode.

14. An image-forming apparatus according to claim 5, wherein the transmitter unit transmits, to the remote image-forming apparatus via the data communication medium, a data request requesting that the remote image-forming apparatus erase the series of image data thereof corresponding to the operation mode data acquired from the remote image-forming apparatus through the acquisition unit.

15. An image-forming apparatus according to claim 5, wherein the transmitter unit transmits, to the remote image-forming apparatus via the data communication medium, a data request requesting that the remote image-forming apparatus update the operation mode data acquired from the remote image-forming apparatus by the acquisition unit.

16. An image-forming apparatus according to claim 7, wherein the remote image-forming apparatus comprises a storage unit that includes a plurality of storage areas and stores, in the areas, image data to be printed, with different pieces of the image data stored from area to area.

17. An image-forming apparatus according to claim 16, further comprising a storage area selection unit adapted to select a desired storage area from among the plurality of the storage areas in the storage unit in the remote image-forming apparatus,

- wherein the acquisition unit acquires, from the remote image-forming apparatus via the data communication medium, a series of image data within a storage area selected by the storage area selection unit, from among the plurality of the storage areas.

18. An image-forming apparatus according to claim 5, further comprising:

- a searching unit adapted to search for a remote image-forming apparatus that communicates data; and
- an image-forming apparatus selection unit adapted to select a desired image-forming apparatus from among candidates in a search result provided by the searching unit,
- wherein the transmitter unit transmits the data request via the data communication medium to the image-forming apparatus selected by the image-forming apparatus selection unit, and
- the acquisition unit acquires, via the data communication medium, data from the remote image-forming apparatus selected by the image-forming apparatus selection unit.

19. An image-forming apparatus according to claim 5, wherein the remote image-forming apparatus stores a series of image data from a host computer.

20. An image-forming apparatus according to claim 19, wherein the remote image-forming apparatus stores a series of image data from the host computer, in association with operation mode data set in the host computer.

21. An image-forming apparatus according to claim 5, wherein the operation mode data comprises a plurality of pieces of setting data about a number of copies, a size of copy sheets, and a discrimination between one-side printing and both-side printing.

22. A method of controlling an image-forming system comprising a plurality of image-forming apparatuses with printing units, each image-forming apparatus comprising (a) a network communication unit and (b) a storage unit adapted to store image data and operation mode data received through the network communication unit, the method comprising:
- an acquisition step of acquiring the image data and the operation mode data, stored in another image-forming apparatus of the plurality of image-forming apparatuses into a first image-forming apparatus of the plurality of image-forming apparatuses through the network communication unit, according to a request from a user of the first image-forming apparatus, the request being made by the user of the first image-forming apparatus via a user interface that displays to the user information about the image data stored in the another image-forming apparatus, the information being obtained from the another image-forming apparatus in response to use by the user of the user interface; and
- an updating step of automatically updating an operation mode of the first image-forming apparatus to an operation mode in accordance with the acquired operation mode data.

23. A computer-readable storage medium storing a software program to be executed by an image-forming system comprising a plurality of image-forming apparatuses with printing units, each image-forming apparatus comprising (a) a network communication unit and (b) a storage unit adapted to store image data and operation mode data received through the network communication unit, the software program comprising:
- program code for an acquisition step of acquiring the image data and the operation mode data, stored in another image-forming apparatus, of the plurality of image-forming apparatuses, into a first image-forming apparatus of the plurality of image-forming apparatuses through the network communication unit, according to a request from a user of said first image-forming apparatus, the request being made by the user of the first image-forming apparatus via a user interface that displays to the user information about the image data stored in the another image-forming apparatus, the information being obtained from the another image-forming apparatus in response to use by the user of the user interface; and
- program code for an updating step of automatically updating an operation mode of the first image-forming apparatus to an operation mode in accordance with the acquired operation mode data.

24. A data processing method comprising:
- a displaying step of displaying to a user of a first image-forming apparatus, information about image data stored in a remote image-forming apparatus, the information being obtained from the remote image-forming apparatus in response to use by the user of the first image-forming apparatus of a user interface, and for prompting the user of the first image-forming apparatus to select image data stored in the remote image-forming apparatus for printing by the first image-forming apparatus;
- a transmitting step of transmitting, to the remote image-forming apparatus storing image data for printing, via a data communication medium, a data request requesting the remote image-forming apparatus to transmit image data stored therein, according to a request from the user of the first image forming apparatus; and
- an acquisition step of acquiring, via the data communication medium, data output by the remote image-forming apparatus in response to the data request, the data including operation mode data preset for the image data stored in the remote image-forming apparatus.

25. A computer-readable storage medium storing a software program, the program comprising:
- program code for a displaying step of displaying, to a user of a first image-forming apparatus, information about image data stored in a remote image-forming apparatus, the information being obtained from the remote image-forming apparatus in response to use by the user of the first image-forming apparatus of a user interface, and for prompting the user of the first image-forming apparatus to select image data stored in the remote image-forming apparatus for printing by the first image-forming apparatus;
- program code for a transmitting step of transmitting, to the remote image-forming apparatus storing image data for printing, via a data communication medium, a data request requesting the remote image-forming apparatus to transmit image data stored therein, according to a request from the user of the first image forming apparatus; and
- program code for an acquisition step of acquiring, via the data communication medium, data output by the remote image-forming apparatus in response to the data request, the data including operation mode data preset for the image data stored in the remote image-forming apparatus.

* * * * *

UNITED STATES PATENT AND TRADEMARK OFFICE
CERTIFICATE OF CORRECTION

PATENT NO. : 7,130,069 B1
APPLICATION NO. : 09/726403
DATED : October 31, 2006
INVENTOR(S) : Masayuki Honma It is certified that error appears in the above-identified patent and that said Letters Patent is hereby corrected as shown below:

COLUMN 3:
Line 47, "show" should read --shows--.

COLUMN 8:
Line 38, "memory. 255," should read --memory 255,--.

COLUMN 15:
Line 6, "status" should read --status.--.

COLUMN 18:
Line 22, "500.of" should read --500 of--.

COLUMN 23:
Line 5, "data is" should read --data are--.

COLUMN 26:
Line 61, "s110." should read --S110.--.

COLUMN 27:
Line 29, "shown" should read --shown in--.

COLUMN 28:
Line 34, "data is" should read --data are--.
Line 65, "an" should read --a--.

Signed and Sealed this

Twenty-sixth Day of June, 2007

JON W. DUDAS
*Director of the United States Patent and Trademark Office*